(12) United States Patent
Zeng et al.

(10) Patent No.: US 11,245,562 B2
(45) Date of Patent: Feb. 8, 2022

(54) DATA PROCESSING METHOD, APPARATUS, AND SYSTEM

(71) Applicant: HUAWEI TECHNOLOGIES CO., LTD., Guangdong (CN)

(72) Inventors: Xin Zeng, Shenzhen (CN); Zongjie Wang, Shenzhen (CN); Yuanzhou Hu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 369 days.

(21) Appl. No.: 16/368,618

(22) Filed: Mar. 28, 2019

(65) Prior Publication Data
US 2019/0222456 A1 Jul. 18, 2019

Related U.S. Application Data

(63) Continuation of application No. PCT/CN2017/103181, filed on Sep. 25, 2017.

(30) Foreign Application Priority Data

Sep. 30, 2016 (CN) .......................... 201610873681.1
Dec. 14, 2016 (CN) .......................... 201611155234.9

(51) Int. Cl.
*H04L 27/26* (2006.01)
*H04L 27/36* (2006.01)
(Continued)

(52) U.S. Cl.
CPC .......... *H04L 27/2636* (2013.01); *H04L 27/20* (2013.01); *H04L 27/2614* (2013.01); *H04L 27/3483* (2013.01); *H04L 27/361* (2013.01)

(58) Field of Classification Search
CPC .................................................. H04L 27/2636
See application file for complete search history.

(56) References Cited

U.S. PATENT DOCUMENTS

2007/0009013 A1 1/2007 Misra et al.
2015/0326358 A1 11/2015 Baldemair et al.
(Continued)

FOREIGN PATENT DOCUMENTS

CN 1452814 A 10/2003
CN 102916783 A 2/2013
(Continued)

OTHER PUBLICATIONS

Gao et al., "Cyclic Prefixed OQAM-OFDM and its Application to Single-Carrier FDMA," IEEE Transactions on Communications, vol. 59, No. 5, XP011322161, pp. 1467-1480, Institute of Electrical and Electronics Engineers, New York, New York (May 2011).
(Continued)

*Primary Examiner* — Kodzovi Acolatse
*Assistant Examiner* — Abdeltif Ajid
(74) *Attorney, Agent, or Firm* — Leydig, Voit & Mayer, Ltd.

(57) ABSTRACT

This application relates to the field of wireless communications technologies, and in particular, to a data processing method, apparatus, and system. This application provides a data processing method. A data sending device modulates a to-be-transmitted bit sequence, splits a real part and an imaginary part of a complex-valued symbol that is obtained through the modulation into two symbols to form a symbol sequence, performs phase rotation of symbols in the symbol sequence, and performs sending by using a single carrier frequency division multiple access (SC-FDMA) symbol. This application is intended to reduce a peak-to-average power ratio (PAPR) of a transmit signal of an orthogonal frequency division multiplexing (OFDM) system by splitting a real part and an imaginary part of a to-be-transmitted signal, and improve link quality of an entire transmission system.

12 Claims, 5 Drawing Sheets

(51) Int. Cl.
*H04L 27/34* (2006.01)
*H04L 27/20* (2006.01)

(56) References Cited

U.S. PATENT DOCUMENTS

| | | | |
|---|---|---|---|
| 2017/0134203 A1* | 5/2017 | Zhu | H04L 27/264 |
| 2017/0338907 A1* | 11/2017 | Atungsiri | H04L 27/2672 |
| 2018/0091343 A1* | 3/2018 | Wang | H04L 25/03006 |
| 2018/0176892 A1* | 6/2018 | Kim | H04W 52/04 |
| 2019/0222461 A1* | 7/2019 | Atungsiri | H04J 11/003 |

FOREIGN PATENT DOCUMENTS

| | | |
|---|---|---|
| CN | 103297373 A | 9/2013 |
| CN | 104639254 A | 5/2015 |
| CN | 105101434 A | 11/2015 |
| WO | 2016075475 A1 | 5/2016 |
| WO | 2016117973 A1 | 7/2016 |

OTHER PUBLICATIONS

Yuen et al., "Single Carrier Frequency Division Multiple Access(SC-FDMA) for Filter Bank Multicarrier Communication Systems," CROWNCOM2010, XP031757371, pp. 1-5, Institute of Electrical and Electronics Engineers, New York, New York (2010).

International Search Report, dated Dec. 20, 2017, in International Application No. PCT/CN2017/103181 (6 pp.).

Zhang, J. et al., "Comparison of the Link Level Performance between OFDMA and SC-FDMA," 2006 First International Conference on Communications and Networking in China, Beijing, 2006 (6 pp.).

Mauritz, O. et al., "Optimum Family of Spectrum-Shaping Functions for PAPR Reduction of DFT-Spread OFDM Signals," IEEE Vehicular Technology Conference, Montreal, Que., 2006 (5 pp.).

International Search Report, dated Dec. 20, 2017, in International Application No. PCT/CN2017/103181 (5 pp.).

Written Opinion of the International Searching Authority, dated Dec. 20, 2017, in International Application No. PCT/CN2017/103181 (7 pp.).

\* cited by examiner

DATA PROCESSING METHOD, APPARATUS, AND SYSTEM

CROSS-REFERENCE TO RELATED APPLICATIONS

This application is a continuation of International Application No. PCT/CN2017/103181, filed on Sep. 25, 2017, which claims priority to Chinese Patent Application No. 201610873681.1, filed on Sep. 30, 2016 and Chinese Patent Application No. 201611155234.9, filed on Dec. 14, 2016, all of which are hereby incorporated by reference in their entireties.

TECHNICAL FIELD

This application relates to the field of wireless communication technologies, and in particular, to a data processing method, apparatus, and system in a wireless communications system.

BACKGROUND

An orthogonal frequency division multiplexing (OFDM) technology has advantages in aspects such as anti-multipath interference and compatibility with multiple-input multiple-output (MIMO). Based on this, this technology is currently used in a relatively large quantity of wireless communication systems, such as Long Term Evolution (LTE) and Worldwide Interoperability for Microwave Access (WiMAX) systems.

However, a high peak-to-average power ratio (PAPR) is a major problem of an OFDM system. When a transmit signal passes a power amplifier (PA), the relatively high PAPR causes signal distortion, and an extra error vector magnitude (EVM) is generated at a transmit end, ultimately causing a decrease in demodulation performance at a receive end. To reduce the EVM of the transmit signal, actual transmit power usually needs to fall back to some extent. However, reduction of the transmit power also causes a decrease in the demodulation performance at the receive end. In particular, in a next-generation communications system such as fifth-generation mobile communication (the 5th Generation mobile communication, 5G), efficiency and maximum transmit power of the PA greatly decrease with application of a high frequency band, imposing a stricter requirement on the PAPR of the transmit signal.

Therefore, a low-PAPR data processing method based on the OFDM system is needed to improve link quality.

SUMMARY

This specification describes a data processing method, apparatus, and system, to reduce a PAPR of a transmit signal of an OFDM system by separating a real part from an imaginary part of a to-be-transmitted signal, and improve link quality of an entire transmission system.

According to a first aspect, this application provides a data processing method, including: modulating, by a data sending device, a to-be-transmitted bit sequence to obtain a first symbol sequence, where the first symbol sequence includes M complex-valued symbols, and M is an integer greater than or equal to 1; splitting a real part and an imaginary part of each complex-valued symbol in the first symbol sequence into two symbols to obtain a second symbol sequence, where the second symbol sequence includes 2M symbols; performing phase rotation on the symbols in the second symbol sequence to obtain a third symbol sequence; generating at least one single carrier frequency division multiple access (SC-FDMA) symbol by using the third symbol sequence; and sending the at least one SC-FDMA symbol. The phase rotation implements orthogonality of the symbols in the second symbol sequence. Amplitude homogenization of time-domain symbols is implemented and a peak value of a to-be-sent symbol is reduced by separating real parts from imaginary parts of the modulated symbols, thereby reducing a PAPR of a transmit signal. Phase rotation is performed on a symbol sequence in which the real parts are separated from the imaginary parts, so that orthogonality of symbols in the symbol sequence is implemented and inter-symbol interference is reduced, thereby improving system performance.

In a possible design, after modulating the to-be-transmitted bit sequence, the data sending device may further perform layer mapping on a modulated symbol sequence to obtain at least one symbol sequence, where the at least one symbol sequence includes the first symbol sequence.

In a possible design, the generating at least one SC-FDMA symbol by using the third symbol sequence includes: performing discrete Fourier transform (DFT) of 2M points on the third symbol sequence to obtain a fourth symbol sequence; and generating the at least one SC-FDMA symbol by using the fourth symbol sequence. The DFT is performed by using all symbols (2M symbols) in the third symbol sequence, and complete information about all complex-valued symbols obtained after the modulation is saved, thereby ensuring transmission performance. Optionally, the at least one SC-FDMA symbol is generated by using the fourth symbol sequence, symbols in the fourth symbol sequence may be further processed, for example, operations such as performing windowing on the fourth symbol sequence and/or extending the fourth symbol sequence are performed, and then inverse fast Fourier transformation (IFFT) is performed on a symbol sequence obtained after the processing, to generate the at least one SC-FDMA symbol.

In a possible design, the generating the at least one SC-FDMA symbol by using the fourth symbol sequence specifically includes: multiplying the fourth symbol sequence by a window function to obtain a fifth symbol sequence that includes Q symbols, where Q is an integer greater than or equal to 1 and $2M \geq Q \geq M$, and the multiplying the fourth symbol sequence by a window function is multiplying, one by one, each symbol in the fourth symbol sequence by a weight; and performing inverse fast Fourier transformation (IFFT) on the fifth symbol sequence to generate the at least one SC-FDMA symbol. Optionally, the window function may be a rectangular window function, a square root raised cosine (SRRC) window function, a Kaiser window function, or the like, and this is not limited in this application. The window function may be implemented in a form of a sequence or a matrix, and includes Q window function elements. After the fourth symbol sequence is multiplied by the window function, consecutive symbols multiplied by the Q window function elements are used as the fifth symbol sequence. Optionally, the data sending device may further perform resource mapping on the fifth symbol sequence, to separately map the symbols in the fifth symbol sequence to a physical resource corresponding to the at least one SC-FDMA symbol, and then generate the at least one SC-FDMA symbol through the IFFT.

In another possible design, the generating the at least one SC-FDMA symbol by using the fourth symbol sequence specifically includes: multiplying any Q consecutive symbols in the fourth symbol sequence by a window function to obtain a fifth symbol sequence that includes Q symbols, where Q is an integer greater than or equal to 1 and 2M≥ Q≥ M, and the multiplying the fourth symbol sequence by a window function is multiplying, one by one, each symbol in the fourth symbol sequence by a weight; and performing inverse fast Fourier transformation (IFFT) on the fifth symbol sequence to generate the at least one SC-FDMA symbol. The window function includes Q window function elements, and a type of the window function is not limited. Optionally, the data sending device may further perform resource mapping on the fifth symbol sequence, to separately map the symbols in the fifth symbol sequence to a physical resource corresponding to the at least one SC-FDMA symbol, and then generate the at least one SC-FDMA symbol through the IFFT.

In still another possible design, the generating the at least one SC-FDMA symbol by using the fourth symbol sequence includes: cyclically extending the fourth symbol sequence to obtain a fifth symbol sequence that includes P symbols, where P is an integer greater than or equal to 2, and P≥2M; multiplying the fifth symbol sequence by a window function to obtain a sixth symbol sequence that includes Q symbols, where Q is an integer greater than or equal to 1, and P≥ Q≥ M; and performing inverse fast Fourier transformation (IFFT) on the sixth symbol sequence to generate the at least one SC-FDMA symbol. Optionally, the window function may be a rectangular window function, an SRRC window function, a Kaiser window function, or the like, and this is not limited in this application. The window function may be implemented in a form of a sequence or a matrix, and includes Q window function elements. After the fifth symbol sequence is multiplied by the window function, consecutive symbols multiplied by the Q window function elements are used as the sixth symbol sequence. Optionally, the data sending device may further perform resource mapping on the sixth symbol sequence, to separately map the symbols in the sixth symbol sequence to a physical resource corresponding to the at least one SC-FDMA symbol, and then generate the at least one SC-FDMA symbol through the IFFT. Cyclically extending a symbol sequence means cyclically repeating the symbol sequence to obtain an extended symbol sequence whose length is greater than or equal to a length of the original symbol sequence. For example, a symbol sequence obtained after the DFT is denoted as $d_{DFT}$, and symbols in the symbol sequence are denoted as $d_{DFT}$ (m), m=0, . . . 2M−1. Then symbols in a symbol sequence obtained after cyclic extension of $d_{DFT}$ are denoted as $d_{CE}$ (n)=$d_{DFT}$(mod(n,2M)), n=0, . . . , P−1, where 2M is a length of the symbol sequence obtained after the DFT, P is a length of the symbol sequence obtained after the cyclic extension, and P≥2M, and mod(n, 2M) indicates an operation of obtaining a remainder after division of n by 2M. A frequency-domain symbol sequence obtained after the DFT is cyclically extended, and an effect of further reducing the PAPR may be achieved by occupying extra frequency-domain bandwidth. It may be understood that any Q consecutive symbols may be taken from the fifth symbol sequence and then multiplied by the window function to obtain the sixth symbol sequence.

In yet another possible design, the generating the at least one SC-FDMA symbol by using the fourth symbol sequence includes: cyclically extending the fourth symbol sequence to obtain a fifth symbol sequence that includes Q symbols, where Q is an integer greater than or equal to 2, and Q≥2M; multiplying the fifth symbol sequence by a window function to obtain a sixth symbol sequence that includes Q symbols; and performing inverse fast Fourier transformation (IFFT) on the sixth symbol sequence to generate the at least one SC-FDMA symbol. Optionally, the window function may be a rectangular window function, an SRRC window function, a Kaiser window function, or the like, and this is not limited in this application. The window function may be implemented in a form of a sequence or a matrix, and includes Q window function elements. Optionally, the data sending device may further perform resource mapping on the sixth symbol sequence, to separately map the symbols in the sixth symbol sequence to a physical resource corresponding to the at least one SC-FDMA symbol, and then generate the at least one SC-FDMA symbol through the IFFT. Cyclically extending a symbol sequence means cyclically repeating the symbol sequence to obtain an extended symbol sequence whose length is greater than or equal to a length of the original symbol sequence. For example, a symbol sequence obtained after the DFT is denoted as $d_{DFT}$, and symbols in the symbol sequence are denoted as $d_{DFT}$(m), m=0, . . . 2M−1. Then symbols in a symbol sequence obtained after cyclic extension of $d_{DFT}$ are denoted as $d_{CE}$ (n)=$d_{DFT}$(mod(n, 2M)), n=0, . . . , Q−1, where 2M is a length of the symbol sequence obtained after the DFT, Q is a length of the symbol sequence obtained after the cyclic extension and Q≥2M, and mod(n, 2M) indicates an operation of obtaining a remainder after division of n by 2M.

In a possible design, the data sending device may further perform precoding before performing the resource mapping. With reference to the foregoing possible design manners, the data sending device may perform precoding on a symbol sequence obtained after the fifth symbol sequence is multiplied by the window function, to obtain a symbol sequence to be transmitted on at least one antenna port, separately perform physical resource mapping on a symbol sequence on each antenna port, and generate the at least one SC-FDMA symbol through the IFFT.

In a possible design, the performing phase rotation on the symbols in the second symbol sequence includes: multiplying each symbol in the second symbol sequence by a phase rotation factor $e^{j\varphi_k}$, where j is an imaginary unit, e is a base of a natural logarithm, and $\varphi_k$ is a phase of the phase rotation factor and satisfies the following formula:

$$\varphi_k = \begin{cases} \dfrac{k\pi}{2}\left(1 - \dfrac{1}{M}\right) + n_k\pi & \text{when } Q \text{ is an even number} \\ \dfrac{k\pi}{2} + n_k\pi & \text{when } Q \text{ is an odd number} \end{cases},$$

where k=0, 1, 2, . . . , 2M−1, and $n_k$ is any integer. The phase rotation based on the foregoing formula supports phase rotation when a length of a sequence is varied, and ensures orthogonality between symbols and orthogonality between a real part and an imaginary part of a symbol when the length of the sequence is varied, thereby reducing inter-symbol interference and improving system performance.

Optionally, when a value of k is varied, a value of $n_k$ may be the same or different. In a possible design, the data sending device is a base station, and the data sending device may notify a data receiving device (for example, user equipment) of the value of $n_k$ or relevant information, or the value of $n_k$ or the relevant information may be predetermined, and this is not limited in this application; alternatively, the data sending device is user equipment, and the data sending device may receive signaling or a message from a data receiving device (for example, a base station), and then learn the value of $n_k$ or the relevant information from the signaling or the message, or the value of $n_k$ or the relevant information may be predetermined, and this is not limited in this application.

In a possible design, the modulating, by a data sending device, a to-be-transmitted bit sequence includes: modulating a to-be-transmitted bit by using at least one of π/4 rotation binary phase shift keying (BPSK), quadrature phase shift keying (QPSK), and quadrature amplitude modulation (QAM) modulation schemes. The π/4 rotation BPSK modulation scheme is to perform +π/4 or −π/4 rotation on a constellation diagram of BPSK modulation based on a BPSK modulation scheme. By using a modulation scheme such as π/4 rotation BPSK, QPSK, or QAM, an effect of amplitude homogenization of time-domain symbols may be achieved in a process of separating a real part from an imaginary part of a modulated symbol, thereby reducing a PAPR of a transmit signal. It may be understood that another modulation scheme, for example, a modulation scheme generated based on optimization of the BPSK, QPSK, or QAM modulation scheme, such as offset quadrature phase shift keying (Offset QPSK, OQPSK) or differential phase shift keying (DPSK), may also be used for the modulation in this application, and this is not limited in this application.

In a possible design, the modulating, by a data sending device, a to-be-transmitted bit sequence includes: modulating a to-be-transmitted bit by using π/4 rotation binary phase shift keying (BPSK), where the π/4 rotation BPSK modulation scheme is a modulation scheme in which +π/4 rotation or −π/4 rotation is performed on a BPSK modulation constellation diagram; and modulating the to-be-transmitted bit sequence within different time units by using the at least one SC-FDMA symbol as a time unit and by using the modulation scheme of +π/4 rotation on the BPSK modulation constellation diagram or the modulation scheme of −π/4 rotation on the BPSK modulation constellation diagram, where a same rotation manner is used for to-be-transmitted bits within a same time unit. In another possible design, alternatively, for the to-be-transmitted bit sequence within different time units, the modulation scheme of +π/4 rotation on the BPSK modulation constellation diagram and the modulation scheme of −π/4 rotation on the BPSK modulation constellation diagram may be alternately used. For example, one SC-FDMA symbol may be used as a time unit to modulate a bit sequence in SC-FDMA symbol l by using the modulation scheme of +π/4 rotation on the BPSK modulation constellation diagram, modulate a bit sequence in SC-FDMA symbol l+1 by using the modulation scheme of −π/4 rotation on the BPSK modulation constellation diagram, and modulate a bit sequence in SC-FDMA symbol l+2 by using the modulation scheme of +π/4 rotation on the BPSK modulation constellation diagram, and so on, where l≥0, and l is an index of an SC-FDMA symbol. For another example, one SC-FDMA symbol is still used as a time unit to modulate an SC-FDMA symbol whose symbol index is an odd number by using the modulation scheme of +π/4 rotation on the BPSK modulation constellation diagram, and modulate an SC-FDMA symbol whose symbol index is an even number by using the modulation scheme of −π/4 rotation on the BPSK modulation constellation diagram. Different rotation modulation schemes are randomly or alternately used within different time units, so that a quantity of SC-FDMA symbols modulated by using the +π/4 rotation manner and a quantity of SC-FDMA symbols modulated by using the −π/4 rotation manner are almost the same within a specific statistical time period, thereby reducing spectrum leakage and improving spectral efficiency. The specific statistical time period includes at least two time units.

In a possible design, for the splitting a real part and an imaginary part of each complex-valued symbol in the first symbol sequence into two symbols to obtain a second symbol sequence, the symbols in the second symbol sequence are formed by alternate arrangement of real parts and imaginary parts of the symbols in the first symbol sequence. Optionally, the symbols in the second symbol sequence are formed by sequential alternate arrangement of the real parts and the imaginary parts of the symbols in the first symbol sequence; the first symbol sequence is denoted as d, and d satisfies d=[$d_0$, $d_1$, . . . , $d_{M-1}$]; and the second symbol sequence is denoted as $d_{offset}$, and $d_{offset}$ satisfies the following formula:

$d_{offset}$=[Re{$d_0$}, Im{$d_0$}, Re{$d_1$}, Im{$d_1$} . . . , Re{$d_{M-1}$}, Im{$d_{M-1}$}, where Re{ } indicates an operation of obtaining a real part and Im{ } indicates an operation of obtaining an imaginary part.

Optionally, the data sending device is a base station, and the data sending device may notify a data receiving device (for example, user equipment) of a rule for generating the second symbol sequence based on the first symbol sequence, or a specific rule for generating the second symbol sequence may be predetermined, and this is not limited in this application; alternatively, the data sending device is user equipment, and the data sending device may receive signaling or a message from a data receiving device (for example, a base station), and then learn a rule for generating the second symbol sequence based on the first symbol sequence from the signaling or the message, or a specific rule for generating the second symbol sequence may be predetermined, and this is not limited in this application.

In a possible design, the data sending device is a base station, and the data sending device sends at least one of information about M, information about Q, and information about a ratio relationship between M and Q to a data receiving device (for example, user equipment). Values of Q and M or the ratio relationship between M and Q may be dynamically adjusted according to a system requirement, thereby dynamically adjusting the PAPR.

In a possible design, the data sending device is user equipment, and the data sending device receives at least one of information about M, information about Q, and information about a ratio relationship between M and Q.

It may be understood that the information about M, the information about Q, and the information about the ratio relationship between M and Q may be numerical information, or other information that can reflect values thereof; or certainly, one or more of the foregoing information may be predetermined. Optionally, a network-side device may send the foregoing information at a moment, for example, before data transmission starts, during access of user equipment, or during resource allocation, or may send the foregoing information as wanted in a data transmission process, thereby dynamically adjusting the PAPR.

According to a second aspect, this application provides a data processing method, including: receiving, by a data receiving device, at least one single carrier frequency division multiple access (SC-FDMA) symbol; obtaining a first symbol sequence in time domain by processing the at least one SC-FDMA symbol, where the first symbol sequence includes 2M symbols, and M is an integer greater than or equal to 1; performing phase de-rotation on the symbols in the first symbol sequence to obtain a second symbol sequence; combining real parts of symbols in the second symbol sequence respectively as real parts and imaginary parts to obtain a third symbol sequence, where the third symbol sequence includes M complex-valued symbols; and demodulating the third symbol sequence to obtain a demodulated bit sequence.

In a possible design, after demodulating the third symbol sequence, the data receiving device may further perform layer demapping on the third symbol sequence to obtain a to-be-demodulated symbol sequence, and then demodulate the to-be-demodulated symbol sequence to obtain a demodulated bit sequence.

In a possible design, the obtaining a first symbol sequence in time domain by processing the at least one SC-FDMA symbol includes: performing fast Fourier transformation (FFT) on the at least one SC-FDMA symbol to obtain a fourth symbol sequence, where the fourth symbol sequence includes Q symbols, and Q is an integer greater than or equal to 1; multiplying the fourth symbol sequence by a window function; performing a sequence extending or sequence shortening operation on a fourth symbol sequence obtained after the multiplication by the window function to obtain a fifth symbol sequence, where the fifth symbol sequence includes 2M symbols, and the multiplying the fourth symbol sequence by a window function is multiplying, one by one, each symbol in the fourth symbol sequence by a weight; and performing inverse discrete Fourier transform (IDFT) of 2M points on the fifth symbol sequence to obtain the first symbol sequence. Optionally, the window function may be a rectangular window function, a square root raised cosine (SRRC) window function, a Kaiser window function, or the like, and this is not limited in this application. The window function may be implemented in a form of a sequence or a matrix, and includes Q window function elements. When Q<2M, a sequence extending operation may be performed on the fourth symbol sequence obtained after the multiplication by the window function. Specifically, 2M-Q symbols are added to the to-be-extended sequence, where positions of the added symbols are the same as positions of symbols that are set to zero when a data sending device multiplies a frequency-domain symbol sequence by a window function. Optionally, specific positions of the added symbols or a rule for adding the symbols may be notified by using signaling or a message, or may be predetermined. When Q>2M, a sequence shortening operation may be performed on the fourth symbol sequence obtained after the multiplication by the window function. Specifically, a cyclic add-back operation may be performed on the to-be-shortened sequence. The cyclic add-back operation means that, corresponding to a cyclic extension operation at a transmit end, symbols extended during the cyclic extension operation at the transmit end are added back to symbols of a sequence for which cyclic extension is not performed, so that a quantity of symbols ultimately obtained is equal to a length of the sequence for which cyclic extension is not performed. Optionally, the performing fast Fourier transformation (FFT) on the at least one SC-FDMA symbol to obtain a fourth symbol sequence further includes: obtaining the symbols in the fourth symbol sequence from a corresponding physical resource after the FFT.

In a possible design, the obtaining, by the data receiving device, a first symbol sequence in time domain by processing the at least one SC-FDMA symbol may further include de-precoding processing. With reference to the foregoing possible design manners, after performing the FFT on the at least one SC-FDMA symbol, the data receiving device obtains at least one symbol sequence on a physical resource corresponding to each antenna port, and performs de-precoding processing on the at least one symbol sequence to obtain the fourth symbol sequence.

In a possible design, the performing phase de-rotation on the symbols in the first symbol sequence includes: multiplying each symbol in the first symbol sequence by a phase de-rotation factor $e^{-j\varphi_k}$, where j is an imaginary unit, e is a base of a natural logarithm, and $\varphi_k$ is a chase of a chase rotation factor and satisfies the following formula:

$$\varphi_k = \begin{cases} \frac{k\pi}{2}\left(1 - \frac{1}{M}\right) + n_k\pi & \text{when } Q \text{ is an even number} \\ \frac{k\pi}{2} + n_k\pi & \text{when } Q \text{ is an odd number} \end{cases},$$

where k=0, 1, 2, . . . , 2M−1, and $n_k$ is any integer.

Optionally, the data receiving device is a base station, and the data receiving device may notify a data sending device (for example, user equipment) of a value of $n_k$ or relevant information, or the value of $n_k$ or the relevant information may be predetermined, and this is not limited in this application; alternatively, the data receiving device is user equipment, and the data receiving device may receive signaling or a message from a data sending device (for example, a base station), and then learn the value of $n_k$ or the relevant information from the signaling or the message, or the value of $n_k$ or the relevant information may be predetermined, and this is not limited in this application.

In a possible design, the real parts of the symbols in the second symbol sequence are combined respectively as real parts and imaginary parts to obtain the third symbol sequence. Optionally, the real parts of the symbols in the second symbol sequence are combined sequentially to form the complex-valued symbols in the third symbol sequence. To be specific, a sequence $\hat{d}_{offset}$ that includes the real parts of the symbols in the second symbol sequence satisfies the following formula:

$$\hat{d}_{offset} = [\text{Re}\{\hat{d}_0\}, \text{Im}\{\hat{d}_0\}, \text{Re}\{\hat{d}_1\}, \text{Im}\{\hat{d}_1\} \ldots \text{Re}\{\hat{d}_{M-1}\}, \text{Im}\{\hat{d}_{M-1}\}]; \text{ and}$$

the third symbol sequence is denoted as $\hat{d}$, and $\hat{d}$ satisfies $\hat{d} = [\hat{d}_0, \hat{d}_1, \ldots \hat{d}_{M-1}]$.

Optionally, the data receiving device is a base station, and the data receiving device may notify a data sending device (for example, user equipment) of a rule for generating the third symbol sequence based on the second symbol sequence, or a specific rule for generating the third symbol sequence may be predetermined, and this is not limited in this application; alternatively, the data receiving device is user equipment, and the data receiving device may receive signaling or a message from a data sending device (for example, a base station), and then learn a rule for generating the third symbol sequence based on the second symbol sequence from the signaling or the message, or a specific rule for generating the third symbol sequence may be predetermined, and this is not limited in this application.

In a possible design, the data receiving device is user equipment, and the data receiving device receives at least one of information about M, information about Q, and information about a ratio relationship between M and Q that are sent by a data sending device (for example, a base station).

In a possible design, the data receiving device is a base station, and the data receiving device sends at least one of information about M, information about Q, and information about a ratio relationship between M and Q to a data sending device (for example, user equipment).

Optionally, a network-side device may send at least one of the information about M, the information about Q, and the information about the ratio relationship between M and Q at a moment, for example, before data transmission starts, during access of user equipment, or during resource allocation, or may send the foregoing information as wanted in a data transmission process, thereby dynamically adjusting a PAPR.

According to a third aspect, this application provides a data sending device, where the data sending device has functions to implement behavior of the data sending device in the foregoing method in practice. The functions may be implemented by hardware, or may be implemented by hardware executing corresponding software. The hardware or software includes one or more modules that correspond to the foregoing functions. Optionally, the data sending device may be a network-side device, such as a base station, or may be user equipment.

According to a fourth aspect, this application provides a data receiving device, where the data receiving device has functions to implement behavior of the data receiving device in the foregoing method in practice. The functions may be implemented by hardware, or may be implemented by hardware executing corresponding software. The hardware or software includes one or more modules that correspond to the foregoing functions. Optionally, the data receiving device may be a network-side device, such as a base station, or may be user equipment.

According to a fifth aspect, this application provides a data sending device, and a structure of the data sending device includes a processor and a transmitter. The processor is configured to provide support for the data sending device to perform corresponding functions in the foregoing method, such as generating or processing data and/or information in the foregoing method. The transmitter is configured to provide support for the data sending device to send data, information, or an instruction in the foregoing method to a data receiving device, for example, to send to-be-transmitted data to the data receiving device by using an SC-FDMA symbol. In a possible design, the data sending device may further include a receiver, and the receiver is configured to receive information or an instruction sent by the data receiving device. In a possible design, the data sending device may be a network-side device, the data sending device may further include a communications interface, and the communications interface is configured to provide support for the data sending device to communicate with another network-side device, such as receiving information or an instruction sent by the another network-side device and/or sending information or an instruction to the another network-side device. In a possible design, the structure of the data sending device may further include a memory, and the memory is configured to couple with the processor and store a program instruction and data that may be necessary for the data sending device.

According to a sixth aspect, this application provides a data receiving device, and a structure of the data receiving device includes a processor and a receiver. The processor is configured to provide support for the data receiving device to perform corresponding functions in the foregoing method, such as generating or processing data and/or information in the foregoing method. The receiver is configured to provide support for the data receiving device to receive data and/or information in the foregoing method. In a possible design, the structure of the data receiving device may further include a transmitter, configured to send information or an instruction as wanted to a data sending device. In a possible design, the data receiving device may be a network-side device, the data receiving device may further include a communications interface, and the communications interface is configured to provide support for the data receiving device to communicate with another network-side device, such as receiving information or an instruction sent by the another network-side device and/or sending information or an instruction to the another network-side device. In a possible design, the structure of the data receiving device may further include a memory, and the memory is configured to couple with the processor and store a program instruction and data that may be necessary for the data receiving device.

According to a seventh aspect, this application provides a communications system, where the system includes the data sending device and the data receiving device according to the foregoing aspects.

According to an eighth aspect, this application provides a computer storage medium, configured to store a computer software instruction to be used by the foregoing data sending device, where the computer storage medium includes a program designed to implement the foregoing aspects.

According to a ninth aspect, this application provides a computer storage medium, configured to store a computer software instruction to be used by the foregoing data receiving device, where the computer storage medium includes a program designed to implement the foregoing aspects.

According to a tenth aspect, this application provides a chip system, where the chip system includes a processor, configured to provide support for a data sending device to implement functions in the foregoing aspects, such as generating or processing data and/or information in the foregoing method. In a possible design, the chip system further includes a memory, and the memory is configured to store a program instruction and data that may be necessary for the data sending device. The chip system may include a chip, or may include a chip and another discrete component.

According to an eleventh aspect, this application provides a chip system, where the chip system includes a processor, configured to provide support for a data receiving device to implement functions in the foregoing aspects, such as receiving or processing data and/or information in the foregoing method. In a possible design, the chip system further includes a memory, and the memory is configured to store a program instruction and data that may be necessary for the data receiving device. The chip system may include a chip, or may include a chip and another discrete component.

Compared with the prior art, this application describes a data processing method, apparatus, and system, to reduce a peak-to-average power ratio (PAPR) of a transmit signal of an OFDM system by separating a real part from an imaginary part of a to-be-transmitted signal, and improve link quality of an entire transmission system.

BRIEF DESCRIPTION OF DRAWINGS

The following describes in detail the embodiments of this application with reference to the accompanying drawings.

DESCRIPTION OF EMBODIMENTS

The following describes the technical solutions in the embodiments of this application with reference to the accompanying drawings in the embodiments of this application.

A network architecture and a service scenario described in the embodiments of this application are intended to describe the technical solutions in the embodiments of this application but shall not be construed as a limitation on the technical solutions provided in the embodiments of this application. A person of ordinary skill in the art may learn that, with evolution of the network architecture and emergence of a new service scenario, the technical solutions provided in the embodiments of this application are also applicable to similar technical problems.

Figure 1:
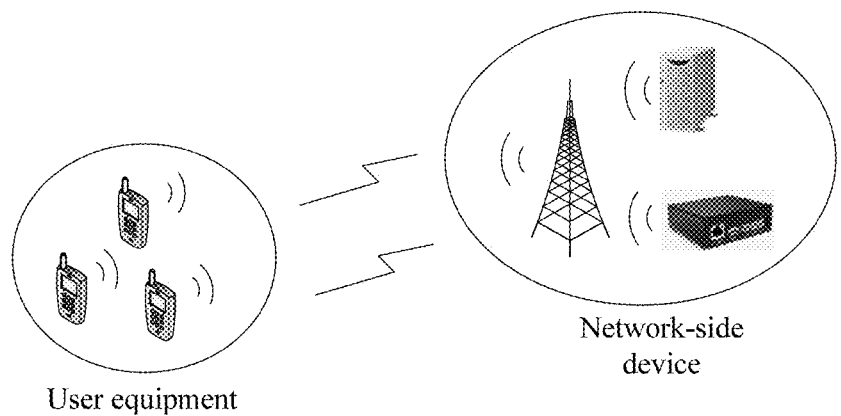
FIG. 1 is a schematic diagram of a possible application scenario according to this application.

Technologies described in this application may be applied to an LTE system and a subsequent evolved system such as fifth-generation mobile communication (the 5th Generation mobile communication, 5G), or another wireless communications system that uses an orthogonal frequency division multiplexing (OFDM) access technology, and are especially applicable to a communications system in which a peak-to-average power ratio (PAPR) of a transmit signal needs to be decreased. FIG. 1 is a schematic diagram of a possible application scenario according to this application. User equipment (UE) accesses a network-side device through a wireless interface to implement communication, and may also perform communication with another user equipment, for example, communication in a device-to-device (D2D) or machine-to-machine (M2M) scenario. A network-side device may perform communication with user equipment, and may also perform communication with another network-side device, for example, communication between a macro base station and an access point. In this application, the terms "network" and "system" are often used interchangeably, but a person skilled in the art can understand their meanings. The user equipment in this application may include various handheld devices, in-vehicle devices, wearable devices, computing devices, and control devices having a wireless communications function; or another processing device connected to a wireless modem; and various forms of UEs, mobile stations (MS), terminals, terminal equipments, or the like. For ease of description, the devices mentioned above are collectively referred to as user equipment (UE) in this application. The network-side device in this application includes a base station (BS), a network controller, a mobile switching center, or the like. An apparatus that directly communicates with the user equipment through a radio channel is usually a base station. The base station may include various forms of macro base stations, micro base stations, relay stations, access points, or remote radio units (RRU), or the like. Certainly, another network-side device having the wireless communications function may also implement wireless communication with the user equipment, and this is not limited in this application. A name of a device having functions of the base station may vary in different systems. For example, the device is referred to as an evolved NodeB (eNB, or eNodeB) on an LTE network, and referred to as a NodeB on a third-generation (the 3rd Generation, 3G) network.

The technical solutions provided in this application may be applied to uplink data transmission and/or downlink data transmission. For the uplink data transmission, a data sending device may be user equipment, and a data receiving device may be a network-side device, such as a base station; and for the downlink data transmission, a data sending device may be a network-side device, such as a base station, and a data receiving device may be user equipment.

The following explains some general concepts or definitions in the embodiments of this application. It needs to be noted that some short names in this specification are descriptions made for the embodiments of this application by using an LTE system as an example and may change along with network evolution. For details about the evolution, refer to descriptions in a corresponding standard.

A single carrier frequency division multiple access (SC-FDMA) symbol in this application may be implemented by using a discrete Fourier transform spread orthogonal frequency division multiplexing (DFT-spread OFDM, DFT-s-OFDM) method, or may be implemented by using a discrete Fourier transform spread orthogonal frequency division multiplexing with spectrum shaping (DFT-spread OFDM with spectrum shaping, DFT-s-OFDM SS) method, or may be implemented by using another method that can be used to generate the SC-FDMA symbol, and this is not limited in this application.

Fast Fourier transformation (FFT) in this application is a fast algorithm to implement discrete Fourier transform (DFT). The FFT described in this application may also be substituted by another algorithm that can implement Fourier transform, and this is not limited in this application. Inverse fast Fourier transformation (IFFT) is a fast algorithm to implement inverse discrete Fourier transform (IDFT). The IFFT in this application may also be substituted by another algorithm that can implement inverse Fourier transform, and this is not limited in this application.

The "data" in this application usually refers to service data, but may also include content such as signaling or a message that needs to be transmitted in a system, for example, a reference signal or an uplink/downlink control message.

The term "and/or" in this application describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

The following describes in detail, with reference to the accompanying drawings, the solutions provided in the embodiments of this application.

Figure 2:
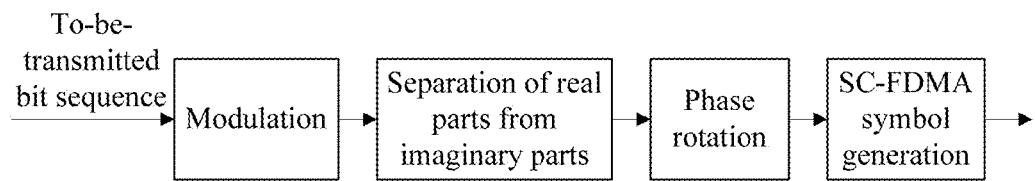
FIG. 2 is a schematic flowchart of a data processing method according to an embodiment of this application.

FIG. 2 is a schematic flowchart of a data processing method according to an embodiment of this application.

A data sending device modulates a to-be-transmitted bit sequence to obtain a first symbol sequence, where the first symbol sequence includes M complex-valued symbols, and M is an integer greater than or equal to 1; splits a real part and an imaginary part of each complex-valued symbol in the first symbol sequence into two symbols to obtain a second symbol sequence, where the second symbol sequence includes 2M symbols; performs phase rotation on the symbols in the second symbol sequence to obtain a third symbol sequence; generates at least one single carrier frequency division multiple access SC-FDMA symbol by using the third symbol sequence; and sends the at least one SC-FDMA symbol.

Optionally, a data processing apparatus (for example, the data sending device) may also directly obtain a symbol sequence based on the to-be-transmitted bit sequence, where symbols in the symbol sequence are real parts and imaginary parts of a complex-valued symbol sequence that are obtained after the splitting.

In an example, after modulating the to-be-transmitted bit sequence, the data sending device obtains a modulated symbol sequence that includes M (M≥1) complex-valued symbols, then splits a real part and an imaginary part of each complex-valued symbol in the complex-valued symbol sequence, arranges obtained real parts and imaginary parts in a specific order to obtain a symbol sequence whose length is 2M, and then performs phase rotation on symbols in the symbol sequence whose length is 2M, so as to implement inter-symbol orthogonality and reduce inter-symbol interference. All or some symbols in the symbol sequence for which the phase rotation has been performed are ultimately sent in a form of SC-FDMA symbols.

Figure 3:
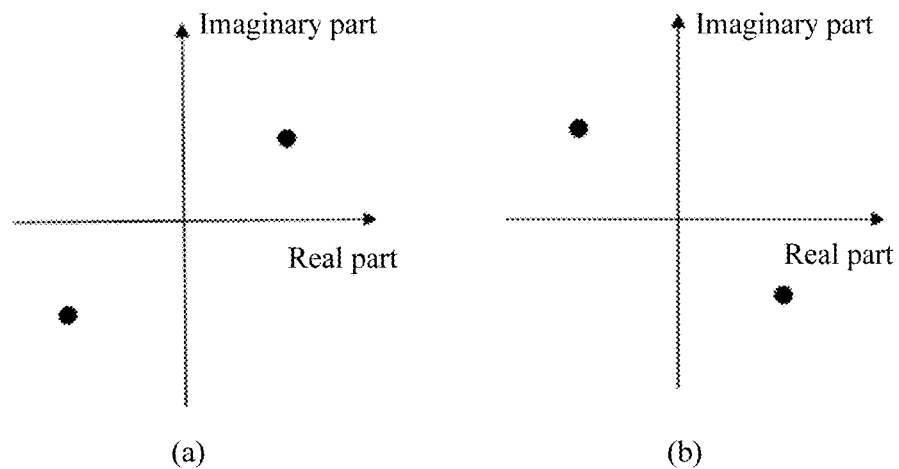
FIG. 3 is a π/4 rotation BPSK constellation diagram according to an embodiment of this application.

Optionally, for the modulating to-be-transmitted bit data, a to-be-transmitted bit may be modulated by using at least one of BPSK, π/4 rotation binary phase shift keying (BPSK), quadrature phase shift keying (QPSK), and quadrature amplitude modulation (QAM) modulation schemes. The π/4 rotation BPSK modulation scheme is to perform +π/4 or −π/4 rotation on a constellation diagram of BPSK modulation based on a BPSK modulation scheme. As shown in FIG. 3, FIG. 3 (a) shows a π/4 rotation BPSK constellation diagram on which +π/4 rotation is performed based on the BPSK modulation scheme, and FIG. 3 (b) shows a π/4 rotation BPSK constellation diagram on which −π/4 rotation is performed based on the BPSK modulation scheme. It may be understood that another modulation scheme, for example, a modulation scheme generated based on optimization of the BPSK, QPSK, or QAM modulation scheme, such as offset quadrature phase shift keying (Offset QPSK, OQPSK) or differential phase shift keying (DPSK), may also be used for the modulation in this application, and this is not limited in this application.

In an example, the data sending device modulates a to-be-transmitted bit by using π/4 rotation BPSK. The π/4 rotation BPSK modulation includes a modulation scheme of +π/4 rotation or −π/4 rotation on the BPSK modulation constellation diagram, as shown in FIG. 3. In a specific example, the +π/4 rotation on the BPSK modulation constellation diagram may be implemented by multiplying a BPSK modulation symbol by $e^{j\pi/4}$, where j is an imaginary unit, and e is a base of a natural logarithm; and similarly, the −π/4 rotation on the BPSK modulation constellation diagram may be implemented by multiplying a BPSK modulation symbol by $e^{-j\pi/4}$.

Optionally, the data sending device modulates the to-be-transmitted bit sequence within different time units by using the at least one SC-FDMA symbol as a time unit and by randomly using the modulation scheme of −π/4 rotation or −π/4 rotation on the BPSK modulation constellation diagram, where a same rotation manner is used for to-be-transmitted bits within a same time unit. In a specific example, two SC-FDMA symbols may be used as a time unit, the modulation scheme of −π/4 rotation on the BPSK modulation constellation diagram or the modulation scheme of −π/4 rotation on the BPSK modulation constellation diagram is randomly selected for each time unit according to a predefined rule. The foregoing rule for randomly selecting a constellation diagram rotation manner may be set according to a system requirement, and this is not limited in this application. For example, the rule for randomly selecting a rotation manner may be determined based on a specific threshold. Specifically, the random rule may be required to ensure that, within a statistical period of time, for example, within L (L≥2) time units, a difference between a quantity of SC-FDMA symbols using one rotation manner and a quantity of SC-FDMA symbols using the other rotation manner does not exceed 10% of a total quantity of SC-FDMA symbols within the L time units, where 10% is an example threshold and may be adjusted according to a system requirement, and this is not limited in this application.

Optionally, a quantity of SC-FDMA symbols included in a time unit may also be set according to a system requirement. For example, one slot may be used as a time unit, and one slot includes at least one SC-FDMA symbol; or one transmission time interval (TTI) may be used as a time unit, and one TTI includes at least one SC-FDMA symbol, and this is not limited in this application.

Optionally, the data sending device modulates the to-be-transmitted bit sequence within different time units by using the at least one SC-FDMA symbol as a time unit and by alternately using the modulation scheme of +π/4 rotation on the BPSK modulation constellation diagram and the modulation scheme of −π/4 rotation on the BPSK modulation constellation diagram, where a same rotation manner is used for to-be-transmitted bits within a same time unit.

Optionally, it may be determined, according to a predefined rule, whether to use the modulation scheme of +π/4 rotation or −π/4 rotation on the BPSK modulation constellation diagram within each time unit. In a specific example, any least one of the following rules may be used to determine whether to use the modulation scheme of +π/4 rotation or −π/4 rotation within each time unit 1, where l≥0, and l is a time unit index:

(1) When l mod 2=1, the modulation is performed by using the modulation scheme of +π/4 rotation on the BPSK modulation constellation diagram; or when l mod 2=0, the modulation is performed by using the modulation scheme of −π/4 rotation on the BPSK modulation constellation diagram, where A mod B indicates a remainder obtained after division of A by B. Certainly, it may be that when l mod 2=0, the modulation is performed by using the modulation scheme of +π/4 rotation on the BPSK modulation constellation diagram; or when l mod 2=1, the modulation is performed by using the modulation scheme of −π/4 rotation on the BPSK modulation constellation diagram. Similar interchange may also apply to rules (2) and (3) in the following description, and details are not described again.

(2) When ⌊l/C⌋ mod 2=1, the modulation is performed by using the modulation scheme of +π/4 rotation on the BPSK modulation constellation diagram; or when ⌊l/C⌋ mod 2=0, the modulation is performed by using the modulation scheme of −π/4 rotation on the BPSK modulation constellation diagram, where ⌊A⌋ indicates rounding down, and C is any positive integer and may be determined according to a system requirement.

(3) When ⌈l/C⌉ mod 2=1, the modulation is performed by using the modulation scheme of +π/4 rotation on the BPSK modulation constellation diagram; or when ⌈l/C⌉ mod 2=0, the modulation is performed by using the modulation scheme of −π/4 rotation on the BPSK modulation constellation diagram, where ⌈A⌉ indicates rounding up, and C is any positive integer and may be determined according to a system requirement.

Optionally, the data receiving device is a base station, and the data receiving device may notify a data sending device (for example, user equipment) of a rule for using a rotation manner within each time unit, or the rule for using a rotation manner may be predetermined, and this is not limited in this application; alternatively, the data receiving device is user equipment, and the data receiving device may receive signaling or a message from a data sending device (for example, a base station), and then learn the rule for using a rotation manner within each time unit from the signaling or the message, or the rule for using a rotation manner may be predetermined, and this is not limited in this application.

Figure 4:
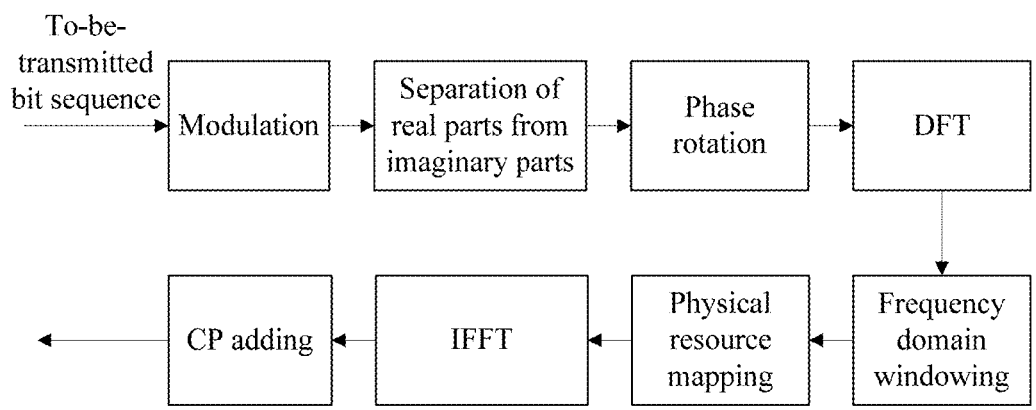
FIG. 4 is a schematic flowchart of another data processing method according to an embodiment of this application.

FIG. 4 is a schematic flowchart of another data processing method according to an embodiment of this application.

After modulating a to-be-transmitted bit, a data sending device obtains a modulated symbol sequence. A specific implementation of the modulation scheme is the same as that in the embodiment corresponding to FIG. 2, and details are not described herein again.

The modulated symbol sequence (a first symbol sequence) that is obtained after the modulation includes M (M≥1) complex-valued symbols. The data sending device splits real parts and imaginary parts of the M complex-valued symbols in the symbol sequence, to obtain a sequence (a second symbol sequence) that includes 2M symbols. Optionally, after the real parts and the imaginary parts are split for the first symbol sequence, obtained real-part and imaginary-part symbols may be arranged in a predefined order to obtain the second symbol sequence, but it needs to be ensured that the real parts and the imaginary parts are spaced apart. To be specific, any two neighboring symbols in the second symbol sequence both include a real part of a complex-valued symbol x and an imaginary part of a complex-valued symbol y, where x and y may be a same symbol or may be different symbols.

In an example, real-part and imaginary-part symbols that are obtained after splitting of a sequence d of M complex-valued symbols are sequentially and alternately arranged to form a sequence $d_{offset}$ that includes 2M symbols and satisfy the following formulas:

$$d=[d_1, d_1, \ldots, d_{M-1}];$$

$d_{offset}=[Re\{d_0\}, Im\{d_0\}, Re\{d_1\}, Im\{d_1\} \ldots, Re\{d_{M-1}\}, Im\{d_{M-1}\}]$, where Re{ } indicates an operation of obtaining a real part and Im{ } indicates an operation of obtaining an imaginary part. For example, $d_0$ is used as an example and denoted as $d_0=a_0+j\cdot b_0$, where j is an imaginary unit. Then $Re\{d_0\}=a_0$, and $Im\{d_0\}=b_0$.

Optionally, a rule for generating the second symbol sequence based on the first symbol sequence may be exchanged between the data sending device and a data receiving device by using signaling, or may be predetermined. In an example, the data sending device is a base station, and the data sending device may notify, by using signaling or another possible message, the data receiving device (for example, user equipment) of the rule for generating the second symbol sequence based on the first symbol sequence, or a specific rule for generating the second symbol sequence may be predetermined. In another example, the data sending device is user equipment, and the data sending device may receive signaling or another possible message sent by the data receiving device (for example, a base station), and then learn the rule for generating the second symbol sequence based on the first symbol sequence from the signaling or the message, or a specific rule for generating the second symbol sequence may be predetermined.

After the real parts and the imaginary parts are split for the modulated symbol sequence, the data sending device performs phase rotation on the symbols in the second symbol sequence.

In an example, the phase rotation may be implemented by multiplying each symbol in the second symbol sequence by a phase rotation factor $e^{j\varphi_k}$, where j is an imaginary unit, e is a base of a natural logarithm, and $\varphi_k$ is a phase of the phase rotation factor and satisfies the following formula:

$$\varphi_k = \begin{cases} \frac{k\pi}{2}\left(1 - \frac{1}{M}\right) + n_k\pi & \text{when } Q \text{ is an even number} \\ \frac{k\pi}{2} + n_k\pi & \text{when } Q \text{ is an odd number} \end{cases},$$

where k=0,1,2, . . . ,2M−1, $n_k$ is any integer, and Q is a quantity of valid symbols kept after frequency domain windowing is performed on the second symbol sequence.

In another example, the phase rotation may also be implemented by multiplying the second symbol sequence by a phase rotation matrix. For example, the phase rotation matrix is denoted as K=diag[$e^{j\varphi_0}, e^{j\varphi_1}, \ldots, e^{j\varphi_{2M-1}}$], where diag[ ] indicates that K is a diagonal matrix in which diagonal elements are sequentially $e^{j\varphi_0}, e^{j\varphi_1}, \ldots, e^{j\varphi_{2M-1}}$, j is an imaginary unit, e is a base of a natural logarithm, and $\varphi_k$ is a phase of a phase rotation factor and satisfies the following formula:

$$\varphi_k = \begin{cases} \frac{k\pi}{2}\left(1 - \frac{1}{M}\right) + n_k\pi & \text{when } Q \text{ is an even number} \\ \frac{k\pi}{2} + n_k\pi & \text{when } Q \text{ is an odd number} \end{cases},$$

where k=0,1,2, . . . ,2M−1, $n_k$ is any integer, and Q is a quantity of valid symbols kept after frequency domain windowing is performed on the second symbol sequence.

Optionally, $n_k$ in the foregoing formulas may be exchanged between the data sending device and the data receiving device by using signaling, or may be predetermined. In an example, the data sending device is a base station, and the data sending device may notify the data receiving device (for example, user equipment) of a value of $n_k$ or relevant information, or the value of $n_k$ or the relevant information may be predetermined. In another example, the data sending device is user equipment, and the data sending device may receive signaling or a message from the data receiving device (for example, a base station), and then learn the value of $n_k$ or the relevant information from the signaling or the message, or the value of $n_k$ or the relevant information may be predetermined.

The data sending device obtains a third symbol sequence after performing the phase rotation on the second symbol sequence, and generates at least one SC-FDMA symbol by using symbols in the third symbol sequence.

Optionally, the generating at least one SC-FDMA symbol by using symbols in the third symbol sequence may include the following steps.

The data sending device first performs DFT of 2M points on the third symbol sequence to obtain a fourth symbol sequence. A method for implementing discrete Fourier transform may be implemented in a manner of multiplying the third symbol sequence by a Fourier transform matrix, or may be implemented in another possible manner, and this is not limited in this application. There may be different definitions for a name of a DFT processing procedure. For example, in an LTE system, the DFT procedure is defined as transform precoder processing but is essentially DFT transform, and this is not limited in this application.

The data sending device multiplies the fourth symbol sequence by a window function to obtain a fifth symbol sequence that includes Q symbols, where Q is an integer greater than or equal to 1 and $2M \geq Q \geq M$, and the multiplying the fourth symbol sequence by a window function is multiplying, one by one, each symbol in the fourth symbol sequence by a weight. In some specific examples, the window function may be a rectangular window function, a square root raised cosine (SRRC) window function, a Kaiser window function, or the like, and this is not limited in this application. The window function may be implemented in a form of a sequence or a matrix, and this is not limited in this application, and the window function includes Q window function elements. In a specific example, the window function may be expressed in the form of a matrix, for example:

$G = \text{diag}[0, \ldots, 0, G_0, G_1, \ldots, G_{Q-1}, 0, \ldots, 0]$, where diag[ ] indicates that G is a matrix in which diagonal elements are sequentially $0, \ldots, 0, G_0, G_1, G_{Q-1}, 0, \ldots, 0$ and other non-diagonal elements are 0. The G matrix is a $2M \times 2M$ matrix, and $G_0, G_1, \ldots, G_{Q-1}$ are the Q window function elements and set to specific values depending on different types of window functions. For example, if the rectangular window function is selected, $G_0 = \ldots = G_{Q-1} = 1$. A quantity of elements 0 before $G_0, G_1, \ldots, G_{Q-1}$ and a quantity of elements 0 after $G_0, G_1, \ldots, G_{Q-1}$ may be set according to a specific requirement, and are not limited in this application. Using the rectangular window function as an example, there may be $G = \text{diag}[1, \ldots 1, 0, \ldots, 0]$, which includes Q 1s and 2M−Q 0s. The fourth symbol sequence is multiplied by the window function matrix G, corresponding Q consecutive symbols multiplied by $G_0, G_1, \ldots, G_{Q-1}$ are kept, and 2M−Q edge elements whose values are 0 are discarded, to obtain the fifth symbol sequence that includes the Q symbols.

Optionally, for multiplying the fourth symbol sequence by a window function to obtain the fifth symbol sequence that includes Q symbols, there may also be another implementation, and this is not limited in this application. For example, first, any Q consecutive symbols are taken from the fourth symbol sequence, and then the Q consecutive symbols are multiplied by a window function. In this case, the window function includes Q window function elements. To be specific, the Q consecutive symbols are multiplied, one by one, by the Q window function elements respectively to obtain Q multiplication result symbols, which form the fifth symbol sequence. In a specific example, if the window function is implemented in the form of a matrix, $G = \text{diag}[G_0, G_1, \ldots, G_{Q-1}]$, where G is a $Q \times Q$ matrix in which diagonal elements are sequentially $G_0, G_1, \ldots, G_{Q-1}$ and other elements are 0, and $G_0, G_1, \ldots, G_{Q-1}$ are the Q window function elements.

Optionally, any Q consecutive symbols may also be directly taken from the fourth symbol sequence and used as the fifth symbol sequence.

Optionally, values of Q and M or a ratio relationship between M and Q may be dynamically adjusted according to a system requirement, thereby dynamically adjusting a PAPR. Optionally, when Q=M, a transmission resource spectrum is not extended; or when Q>M, the PAPR may be further reduced by extending the transmission resource spectrum and reducing spectral efficiency.

Optionally, information about Q and M may be exchanged between the data sending device and the data receiving device by using signaling or another possible message, or may be predetermined. The information about Q and M may include at least one of information about M, information about Q, and information about a ratio relationship between M and Q. In an example, the data sending device is a base station, and the data sending device sends at least one of the information about M, the information about Q, and the information about the ratio relationship between M and Q to the data receiving device (for example, user equipment). In another example, the data sending device is user equipment, and the data sending device receives at least one of the information about M, the information about Q, and the information about the ratio relationship between M and Q. It may be understood that the information about M, the information about Q, and the information about the ratio relationship between M and Q may be numerical information, or other information that can reflect values thereof; or certainly, one or more of the foregoing information may be predetermined.

In a specific example, using an LTE system as an example, a base station may notify user equipment of the information about the ratio relationship between M and Q by using downlink control information (DCI). First, the ratio relationship between M and Q may be indicated by adding different bandwidth ratio (denoted as $R_{BW}$) information to modulation and coding scheme (MCS) information. For example, in a bandwidth ratio $R_{BW}$ column in Table 1, specific Q/M ratio relationships (herein, "/" represents division) under different MCS schemes are stipulated. When an MCS index is 0, $R_{BW}=2$, indicating that a numerical value of Q is twice a numerical value of M. When an MCS index is 1, $R_{BW}=1.5$, indicating that a numerical value of Q is 1.5 times a numerical value of M. When an MCS index is 2, $R_{BW}=1$, indicating that a numerical value of Q is equal to a numerical value of M. Bandwidth extension may be performed for to-be-transmitted data by adjusting a bandwidth coefficient, for example, to extend to 1.5 times or twice bandwidth, that is, to send data on 1.5 times or twice a quantity of subcarriers to obtain a lower PAPR, so that greater transmit power may be used to improve edge coverage performance. The base station may dynamically send the MCS index in the DCI, thereby adjusting the bandwidth.

TABLE 1

A possible manner of indicating the ratio relationship between M and Q

| MCS index | Modulation order | Bandwidth ratio $R_{BW}$ | Transport block size index |
|---|---|---|---|
| 0 | 2 | 2 | 0 |
| 1 | 2 | 1.5 | 0 |
| 2 | 2 | 1 | 0 |
| ... | ... | ... | ... |

In another specific example, an information element may be separately added to the DCI to transmit Q/M information. For example, a plurality of bits are used to represent a plurality of bandwidth ratio configurations.

Optionally, the foregoing information may also be notified by using other signaling or another information element, and a specific design rule and a specific notification manner are not limited in this application. The data sending device performs inverse fast Fourier transformation (IFFT) on the fifth symbol sequence to generate the at least one SC-FDMA symbol. In an example, the data sending device performs physical resource mapping on the symbols in the fifth symbol sequence, to separately map the symbols in the fifth symbol sequence to a physical resource corresponding to the at least one SC-FDMA symbol, and then generates the at least one SC-FDMA symbol through the IFFT operation and an operation of adding a cyclic prefix (CP).

The data sending device sends the generated at least one SC-FDMA symbol.

It may be understood that another necessary processing step may be added to the foregoing data processing procedure according to a system requirement, and this is not limited in this application.

Figure 5:
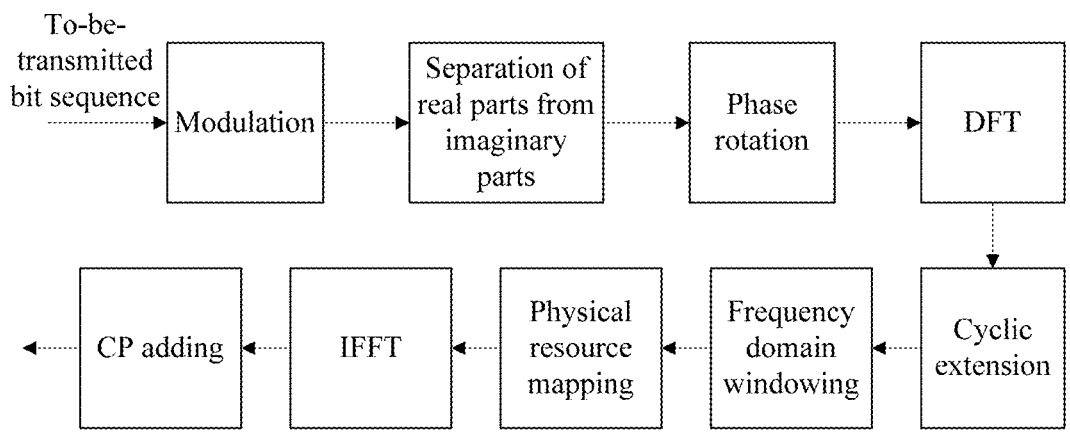
FIG. 5 is a schematic flowchart of still another data processing method according to an embodiment of this application.

FIG. 5 is a schematic flowchart of still another data processing method according to an embodiment of this application.

A data sending device modulates a to-be-transmitted bit sequence, separates real parts from imaginary parts, performs phase rotation, and performs a DFT operation, to obtain a fourth symbol sequence. A specific implementation of the foregoing process is the same as that in the embodiment corresponding to FIG. 4, and details are not described herein again.

A difference is that, in the embodiment shown in FIG. 5, the data sending device may further cyclically extend the fourth symbol sequence to obtain a fifth symbol sequence that includes P symbols, where P≥2M. Cyclically extending a symbol sequence means cyclically repeating the symbol sequence to obtain an extended symbol sequence whose length is greater than or equal to a length of the original symbol sequence. For example, a symbol sequence obtained after the DFT is denoted as $d_{DFT}$, and symbols in the symbol sequence are denoted as $d_{DFT}(m)$, m=0, . . . 2M–1. Then symbols in a symbol sequence obtained after cyclic extension of $d_{DFT}$ are denoted as $d_{CE}(n)=d_{DFT}(\mod(n, 2M))$, n=0, . . . , P–1, where 2M is a length of the symbol sequence obtained after the DFT, P is a length of the symbol sequence obtained after the cyclic extension, and P≥2M, and mod(n, 2M) indicates an operation of obtaining a remainder after division of n by 2M. It may be understood that, when P=2M, the data sending device may send the fourth symbol sequence to a cyclic extension module, but cyclic extension processing is not performed; or may directly send the fourth symbol sequence, without passing the cyclic extension module, to a processing unit following the cyclic extension module.

The data sending device multiplies the fifth symbol sequence by a window function to obtain a sixth symbol sequence that includes Q symbols, where Q is an integer greater than or equal to 1, and P≥ Q≥ M. In the embodiment corresponding to FIG. 5, if the window function is expressed in a form of a matrix, a matrix G is a P×P matrix, and diagonal elements of the matrix G include $G_0, G_1, \ldots, G_{Q-1}$ and P–Q elements 0. Other specific implementations are the same as those in the embodiment corresponding to FIG. 4, and details are not described herein again.

Optionally, any Q consecutive symbols may also be taken from the fifth symbol sequence first and then multiplied by a window function to obtain the sixth symbol sequence. A specific implementation is the same as that in the embodiment corresponding to FIG. 4, and details are not described herein again.

In another possible implementation, the data sending device may further cyclically extend the fourth symbol sequence to directly obtain a fifth symbol sequence that includes Q symbols, where Q is an integer greater than or equal to 2 and Q≥2M, and an implementation of the cyclic extension is similar to the foregoing description, except that a length of a symbol sequence obtained after the extension is Q. Then the fifth symbol sequence is multiplied by a window function to obtain a sixth symbol sequence that includes Q symbols. In this case, if the window function is expressed in a form of a matrix, a window function G is a Q×Q matrix in which diagonal elements are sequentially $G_0, G_1, \ldots, G_{Q-1}$ and other elements are 0, where $G_0, G_1, \ldots, G_{Q-1}$ are the Q window function elements.

Optionally, any Q consecutive symbols may also be directly taken from the fifth symbol sequence and used as the sixth symbol sequence. In particular, when the fifth symbol sequence includes only Q symbols, the fifth symbol sequence and the sixth symbol sequence are the same.

Then the data sending device performs inverse fast Fourier transformation (IFFT) on the sixth symbol sequence to generate the at least one SC-FDMA symbol. Optionally, the data sending device may further perform resource mapping on the sixth symbol sequence, to separately map the symbols in the sixth symbol sequence to a physical resource corresponding to the at least one SC-FDMA symbol, and then generate the at least one SC-FDMA symbol through the IFFT operation and an operation of adding a CP.

The data sending device sends the generated at least one SC-FDMA symbol.

Except for the difference in the foregoing description, for implementations of other steps in the embodiment in FIG. 5, refer to a detailed description of the embodiment in FIG. 4.

For example, for a manner of notifying information about M, information about Q, and information about a ratio relationship between M and Q, or the like, refer to a detailed description of the embodiment in FIG. 4, and details are not described herein again.

It may be understood that another necessary processing step may be added to the foregoing data processing procedure according to a system requirement, and this is not limited in this application.

Figure 6A:
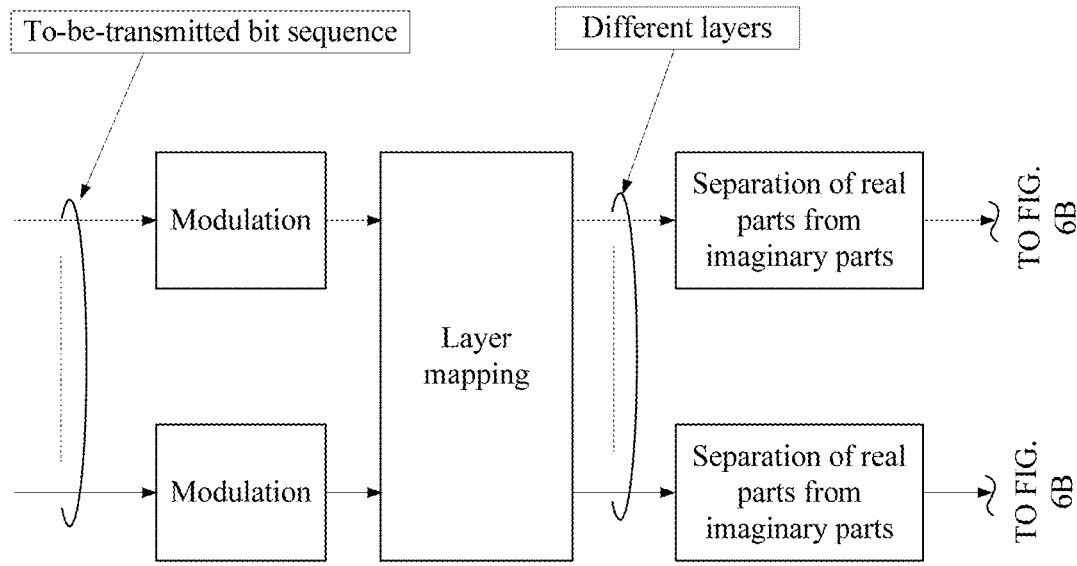
FIG. 6A, FIG. 6B, and FIG. 6C are a schematic flowchart of yet another data processing method according to an embodiment of this application.
Figure 6B:
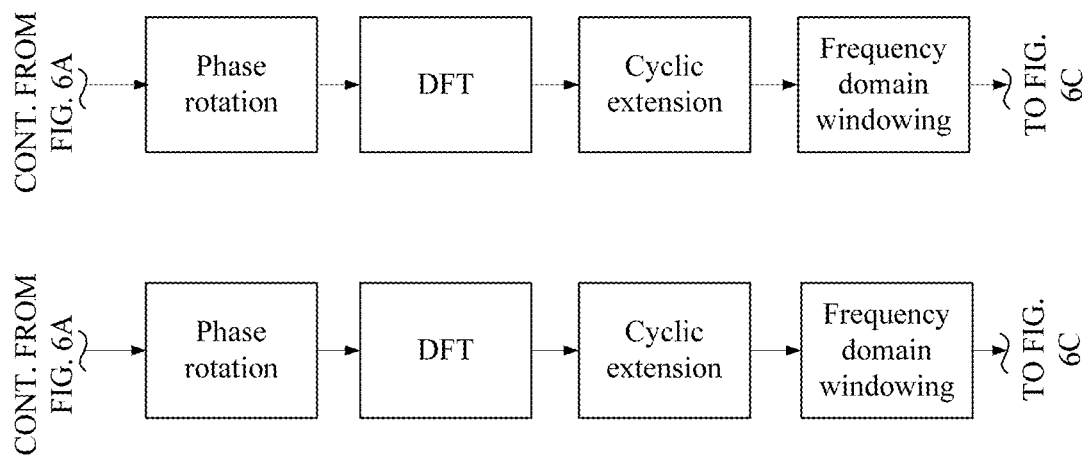
Figure 6C:
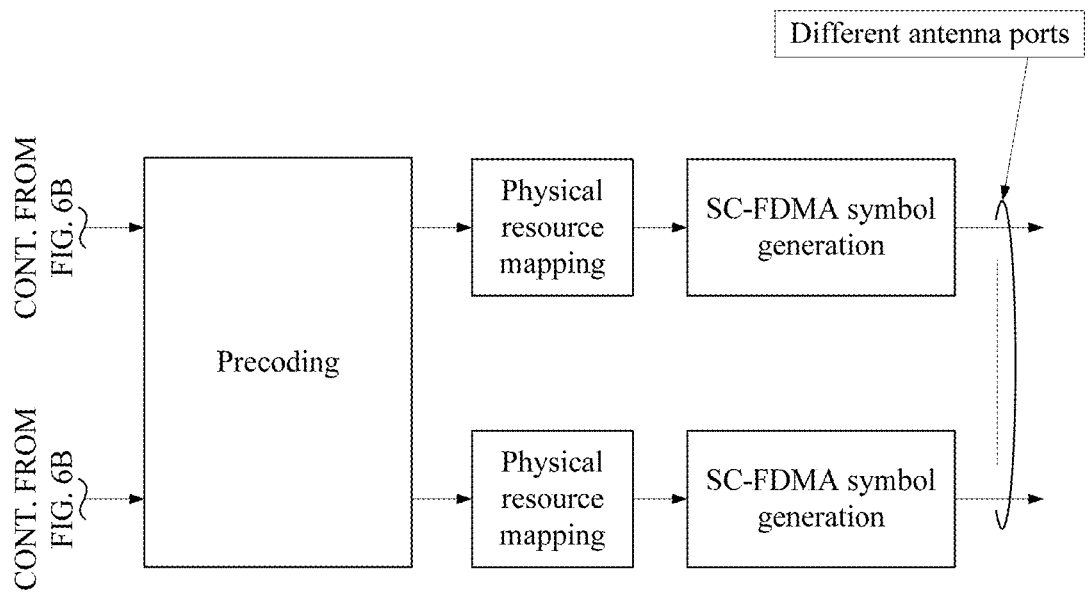

FIG. 6A, FIG. 6B, and FIG. 6C are a schematic flowchart of yet another data processing method according to an embodiment of this application.

On a basis of the embodiment in FIG. 4 or the embodiment in FIG. 5, a data sending device may further perform a layer mapping operation and/or a precoding operation on a to-be-transmitted bit sequence. In a specific example, FIG. 6A, FIG. 6B, and FIG. 6C show a data processing method in which the layer mapping operation and the precoding operation are added based on FIG. 5.

The data sending device modulates at least one to-be-transmitted bit sequence to obtain at least one modulated symbol sequence, and symbol sequences at different layers are generated after layer mapping is performed on the at least one modulated symbol sequence, so as to implement spatial multiplexing, transmit diversity, or another function that needs to be implemented by a system. A specific implementation of the layer mapping is not limited in this application. For example, a layer mapping processing mode defined in the 3rd Generation Partnership Project (3GPP) Protocol TS 36.211 may be used.

The data sending device separately performs operations, such as separation of real parts from imaginary parts, phase rotation, DFT, cyclic extension, and frequency domain windowing, on a symbol sequence at each layer. For a specific implementation of the symbol sequence at each layer, refer to the embodiment corresponding to FIG. 4 or the embodiment corresponding to FIG. 5, and details are not described herein again.

The data sending device performs a precoding operation on at least one symbol sequence obtained after frequency domain windowing, to transform data at different layers onto different antenna ports, so as to implement spatial multiplexing, transmit diversity, or another function that needs to be implemented by the system. A specific implementation of the precoding is not limited in this application. For example, a precoding processing mode defined in the 3GPP Protocol TS 36.211 may be used.

The data sending device separately performs physical resource mapping on at least one symbol sequence that is precoded to ultimately generate SC-FDMA symbols on different antenna ports, and sends the SC-FDMA symbols. For implementations of the physical resource mapping and SC-FDMA, refer to the embodiment corresponding to FIG. 4 or the embodiment corresponding to FIG. 5, and details are not described herein again.

It may be understood that another necessary processing step may be added to the foregoing data processing procedure according to a system requirement, and this is not limited in this application.

Figure 7:
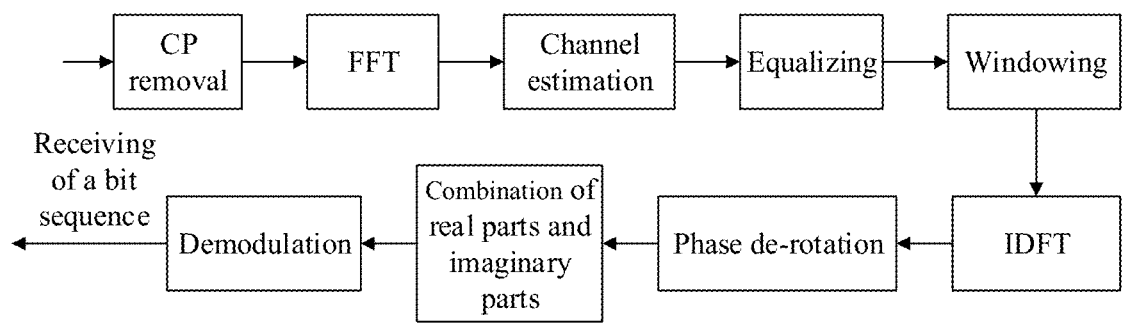
FIG. 7 is a schematic flowchart of a data processing method at a receive end according to an embodiment of this application.

FIG. 7 is a schematic flowchart of a data processing method at a receive end according to an embodiment of this application.

A data receiving device receives at least one SC-FDMA symbol, and obtains a first symbol sequence in time domain by processing the at least one SC-FDMA symbol, where the first symbol sequence includes 2M symbols, and M is an integer greater than or equal to 1.

Optionally, after receiving the at least one SC-FDMA symbol, the data receiving device performs a CP removal operation and an FFT operation on the at least one SC-FDMA symbol to obtain a frequency-domain symbol sequence (denoted as a fourth symbol sequence), where the fourth symbol sequence includes Q symbols, and Q is an integer greater than or equal to 1. Optionally, the performing FFT on the at least one SC-FDMA symbol to obtain a fourth symbol sequence further includes: obtaining the symbols in the fourth symbol sequence from a corresponding physical resource after the FFT.

Optionally, the data receiving device may further perform, on the fourth symbol sequence, channel estimation, equalizing, and other possible processing that is wanted in a receiver.

Optionally, the data receiving device multiplies the fourth symbol sequence by a window function, and the multiplying the fourth symbol sequence by a window function is multiplying, one by one, each symbol in the fourth symbol sequence by a weight. Optionally, the window function may be a rectangular window function, an SRRC window function, a Kaiser window function, or the like, and this is not limited in this application. A purpose of performing, by the data receiving device, windowing on the fourth symbol sequence is to implement matched filtering of a receiver. The window function may be implemented in a form of a sequence or a matrix, and includes Q window function elements. It may be understood that the operation of multiplying the window function may also be omitted, and this is not limited in this application.

Optionally, the data receiving device performs a sequence extending or sequence shortening operation on a fourth symbol sequence obtained after the multiplication by the window function (or the fourth symbol sequence that is not yet multiplied by the window function) to obtain a fifth symbol sequence, where the fifth symbol sequence includes 2M symbols.

In a possible example, when Q<2M, a sequence extending operation may be performed on the fourth symbol sequence obtained after the multiplication by the window function (or the fourth symbol sequence that is not yet multiplied by the window function). Specifically, 2M−Q symbols are added to the to-be-extended sequence, where positions of the added symbols are the same as positions of symbols that are set to zero when a data sending device multiplies a frequency-domain symbol sequence by a window function. Optionally, specific positions of the added 2M−Q symbols or a rule for adding the symbols may be notified by using signaling or a message, or may be predetermined. In a specific example, the added 2M−Q symbols may be all zeros, or may be symbol values determined in another manner.

In another possible example, when Q>2M, a sequence shortening operation may be performed on the fourth symbol sequence obtained after the multiplication by the window function (or the fourth symbol sequence that is not yet multiplied by the window function). Specifically, a cyclic add-back operation may be performed on the to-be-shortened sequence. The cyclic add-back operation means that, corresponding to a cyclic extension operation at a transmit end, symbols extended during the cyclic extension operation at the transmit end are added back to symbols of a sequence for which cyclic extension is not performed, so that a quantity of symbols ultimately obtained is equal to a length of the sequence for which cyclic extension is not performed. For example, the transmit end cyclically extends a sequence {a, b, c} to obtain a sequence {a, b, c, a, b, c, a} and send the {a, b, c, a, b, c, a}. When receiving a corresponding sequence {a', b', c', a'', b'', c'', a'''}, the transmit end performs a cyclic add-back operation to obtain a sequence {a'+a''+b'+b'', c'+c''}. It may be understood that the sequence shortening operation may also be implemented in another manner, for example, a partial sequence that includes 2M consecutive symbols is directly used as the fifth symbol sequence, and this is not limited in this application. It may be understood that, when Q=2M, the sequence extending or shortening operation may not be performed, and in this case, the fifth symbol sequence is the same as the fourth symbol sequence obtained after the multiplication by the window function (or the fourth symbol sequence that is not yet multiplied by the window function).

Optionally, information about Q and M may be exchanged between the data sending device and the data receiving device by using signaling or another possible message, or may be predetermined. The information about Q and M may include at least one of information about M, information about Q, and information about a ratio relationship between M and Q. In an example, the data receiving device is user equipment, and the data receiving device receives at least one of the information about M, the information about Q, and the information about the ratio relationship between M and Q that are sent by the data sending device (for example, a base station). In another example, the data receiving device is a base station, and the data receiving device sends at least one of the information about M, the information about Q, and the information about the ratio relationship between M and Q to the data sending device (for example, user equipment). It may be understood that the information about M, the information about Q, and the information about the ratio relationship between M and Q may be numerical information, or other information that can reflect values thereof; or certainly, one or more of the foregoing information may be predetermined. For a specific notification manner, refer to a specific description of the embodiment in FIG. 4, and details are not described herein again.

Optionally, the data receiving device performs IDFT of 2M points on the fifth symbol sequence to obtain the first symbol sequence.

Optionally, the obtaining, by the data receiving device, a first symbol sequence in time domain by processing the at least one SC-FDMA symbol may further include de-precoding processing. In an example, after performing FFT on the at least one SC-FDMA symbol, the data receiving device obtains at least one symbol sequence on a physical resource corresponding to each antenna port, and performs de-precoding processing on the at least one symbol sequence to obtain the fourth symbol sequence.

The data receiving device performs phase de-rotation on the symbols in the first symbol sequence to obtain a second symbol sequence. In an example, the data receiving device multiplies each symbol in the first symbol sequence by a phase de-rotation factor $e^{-j\varphi_k}$, where j is an imaginary unit, e is a base of a natural logarithm, and $\varphi_k$ is a phase of a phase rotation factor and satisfies the following formula:

$$\varphi_k = \begin{cases} \frac{k\pi}{2}\left(1 - \frac{1}{M}\right) + n_k\pi & \text{when } Q \text{ is an even number} \\ \frac{k\pi}{2} + n_k\pi & \text{when } Q \text{ is an odd number} \end{cases},$$

where
k=0,1,2, . . . ,2M−1, and $n_k$ is any integer.

In another example, the phase de-rotation may also be implemented by multiplying a phase rotation matrix. For example, the phase rotation matrix is denoted as R= diag[$e^{-j\varphi_0}$, $e^{-j\varphi_1}$, . . . , $e^{-j\varphi_{2M-1}}$], where diag[ ] indicates that K is a diagonal matrix in which diagonal elements are sequentially $e^{-j\varphi_0}$, $e^{-j\varphi_1}$, . . . , $e^{-j\varphi_{2M-1}}$, j is an imaginary unit, e is a base of a natural logarithm, and $\varphi_k$ is a phase of a phase rotation factor and satisfies the following formula:

$$\varphi_k = \begin{cases} \frac{k\pi}{2}\left(1 - \frac{1}{M}\right) + n_k\pi & \text{when } Q \text{ is an even number} \\ \frac{k\pi}{2} + n_k\pi & \text{when } Q \text{ is an odd number} \end{cases},$$

where
k=0, 1, 2, . . . , 2M−1, and $n_k$ is any integer.

Optionally, $n_k$ in the foregoing formulas may be exchanged between the data sending device and the data receiving device by using signaling, or may be predetermined. In an example, the data receiving device is a base station, and the data receiving device may notify the data sending device (for example, user equipment) of a value of $n_k$ or relevant information, or the value of $n_k$ or the relevant information may be predetermined. In another example, the data receiving device is user equipment, and the data receiving device may receive signaling or a message from the data sending device (for example, a base station), and then learn the value of $n_k$ or the relevant information from the signaling or the message, or the value of $n_k$ or the relevant information may be predetermined.

The data receiving device combines real parts of symbols in the second symbol sequence respectively as real parts and imaginary parts to obtain a third symbol sequence, where the third symbol sequence includes M complex-valued symbols.

A manner in which the data receiving device obtains the third symbol sequence based on the second symbol sequence depends on an operation manner in which the data sending device separates real parts from imaginary parts. Optionally, the real parts of the symbols in the second symbol sequence are combined sequentially to form the complex-valued symbols in the third symbol sequence. To be specific, a sequence $\hat{d}_{offset}$ that includes the real parts of the symbols in the second symbol sequence satisfies the following formula:

$$\hat{d}_{offset} = [\text{Re}\{\hat{d}_0\}, \text{Im}\{\hat{d}_0\}, \text{Re}\{\hat{d}_1\}, \text{Im}\{\hat{d}_1\} \ldots, \text{Re}\{\hat{d}_{M-1}\}, \text{Im}\{\hat{d}_{M-1}\}]; \text{ and}$$

the third symbol sequence $\hat{d}$ satisfies $\hat{d}=[\hat{d}_0, \hat{d}_1, \ldots, \hat{d}_{M-1}]$.

Optionally, a rule for generating the third symbol sequence based on the second symbol sequence may be exchanged between the data sending device and the data receiving device by using signaling, or may be predetermined. In an example, the data receiving device is a base station, and the data receiving device may notify the data sending device (for example, user equipment) of the rule for generating the third symbol sequence based on the second symbol sequence, or a specific rule for generating the third symbol sequence may be predetermined. In another example, the data receiving device is user equipment, and the data receiving device may receive signaling or a message from the data sending device (for example, a base station), and then learn the rule for generating the third symbol sequence based on the second symbol sequence from the signaling or the message, or a specific rule for generating the third symbol sequence may be predetermined.

The data receiving device demodulates the third symbol sequence to obtain a demodulated bit sequence. A specific demodulation method is not limited in this application, provided that the demodulation method is kept consistent with a modulation scheme at the transmit end. For the modulation scheme at the transmit end, refer to the description of the embodiment corresponding to FIG. 2, and details are not described herein again.

Optionally, after demodulating the third symbol sequence, the data receiving device may further perform layer demapping on the third symbol sequence to obtain a to-be-demodulated symbol sequence, and then demodulate the to-be-demodulated symbol sequence to obtain a demodulated bit sequence.

It needs to be noted that the numbers of the symbol sequences in this application, such as the "first" and "second", are only intended for clear description but shall not be construed as any limitation. Symbol sequences with a same number in different embodiments may be the same or different. In particular, a symbol sequence in a processing procedure of the data receiving device and a symbol sequence with a same number in a processing procedure of the data sending device may be different. For example, the first symbol sequence in the data sending device and the first symbol sequence in the data receiving device may be different.

In the foregoing embodiments of this application, the data transmission methods provided in the embodiments of this application are described from a perspective of each network element and from a perspective of interaction between various network elements. It may be understood that, to implement the foregoing functions, each network element, for example, the data sending device (a network-side device or UE) or the data receiving device (UE or a network-side device), includes a corresponding hardware structure and/or a software module for performing each function. A person skilled in the art should easily be aware that, with reference to the examples described in the embodiments disclosed in this specification, units and algorithm steps may be implemented by hardware or a combination of hardware and computer software in this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

Figure 8:
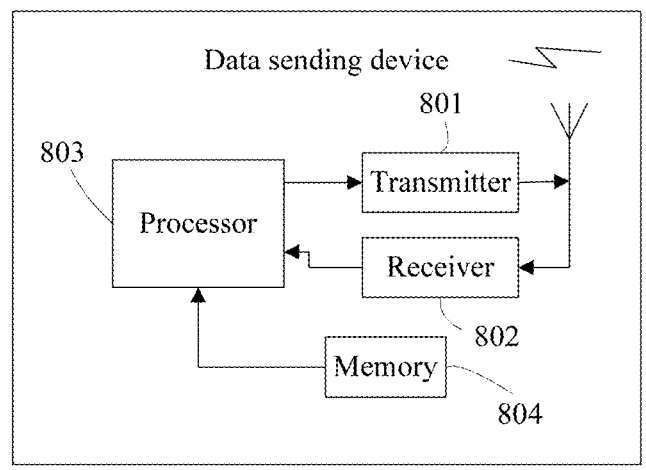
FIG. 8 is a schematic structural diagram of a data sending device according to an embodiment of this application.

FIG. 8 is a schematic diagram of a possible structure of the data sending device according to the foregoing embodiments.

Optionally, the data sending device may be a network-side device, for example, may be a base station or another network-side device having functions of a base station; or may be user equipment; or may be another apparatus having a data sending function.

In a specific example, the structure of the data sending device includes a processor and a transmitter. In a specific example, the structure of the data sending device may further include a receiver. In a specific example, when the data sending device is a network-side device, the structure of the data sending device may further include a communications interface, configured to support communication with another network-side device, for example, communication with a core-network node. In a possible example, the structure of the data sending device may further include a memory, and the memory is configured to couple with the processor and store a program instruction and data that may be necessary for the data sending device. In an example corresponding to FIG. 8, the structure of the data sending device in this application includes a transmitter 801, a receiver 802, a processor 803, and a memory 804.

In uplink, to-be-sent data or information (for example, a to-be-transmitted bit sequence) is processed by the transmitter 801, an uplink signal is generated, and the uplink signal is transmitted by an antenna to the data receiving device in the foregoing embodiments. In downlink, the antenna receives a downlink signal (including the foregoing data and/or control information) transmitted by the data receiving device in the foregoing embodiments, and the receiver 802 processes the signal received from the antenna and provides input sampling. The processor 803 processes service data and a signaling message, for example, modulates to-be-sent data and generates an SC-FDMA symbol. The transmitter, the receiver, and the processor process the data and/or signal by using a wireless access technology (for example, an access technology of LTE or another evolved system) that is used in a radio access network. The processor 803 is further configured to control and manage actions of the data sending device, and configured to perform the processing that is performed by the data sending device in the foregoing embodiments, for example, configured to control the data sending device to process to-be-sent data and/or perform other processes of the technologies described in this application. The processor 803 is further configured to provide support for the data sending device to perform the processing procedures of the data sending device in FIG. 2 to FIG. 6A, FIG. 6B, and FIG. 6C. The memory 804 is configured to store program code and data of the data sending device.

Figure 9:
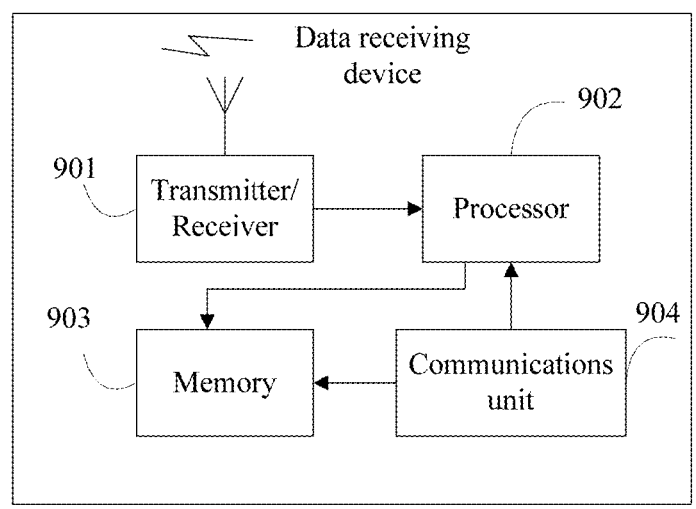
FIG. 9 is a schematic structural diagram of a data receiving device according to an embodiment of this application.

FIG. 9 is a simplified schematic diagram of a possible design structure of the data receiving device according to the foregoing embodiments.

Optionally, the data receiving device may be a network-side device, for example, may be a base station or another network-side device having functions of a base station; or may be user equipment; or may be another apparatus having a data receiving function.

In a possible example, the structure of the data receiving device includes a processor and a receiver. In a possible example, the structure of the data receiving device may further include a transmitter. In a possible example, the data receiving device may be a network-side device, the data receiving device may further include a communications interface, and the communications interface is configured to provide support for the data receiving device to communicate with another network-side device, such as receiving information or an instruction sent by the another network-side device, and/or sending information or an instruction to the another network-side device. In a possible example, the structure of the data receiving device may further include a memory, and the memory is configured to couple with the processor and store a program instruction and data that may be necessary for the data receiving device. In an example corresponding to FIG. 9, the structure of the data receiving device in this application includes a transmitter/receiver 901, a processor 902, a memory 903, and a communications interface 904.

The transmitter/receiver 901 is configured to provide support for the data receiving device to send information to or receive information from the data sending device in the foregoing embodiments, for example, to send the data and/or control information and receive the to-be-transmitted data (such as an SC-FDMA symbol). The processor 902 performs various functions used to communicate with the data sending device. The processor 902 also performs the processing procedure of the data receiving device in FIG. 7, for example, receives and processes an SC-FDMA symbol. The memory 903 is configured to store program code and data of the data receiving device. The communications interface 904 is configured to provide support for the data receiving device to communicate with another network-side device, for example, an X2 interface or an S1 interface.

It may be understood that FIG. 9 merely shows a simplified design of the data receiving device. In actual application, the data receiving device may include any quantity of transmitters, receivers, processors, memories, and the like, and all data receiving devices that can implement this application shall fall within the protection scope of this application.

The processor of the data sending device or the data receiving device in this application may be a central processing unit (CPU), a general-purpose processor, a digital signal processor (DSP), an application-specific integrated circuit (ASIC), a field programmable gate array (FPGA) or another programmable logic device, a transistor logic device, a hardware device, or any combination thereof. The processor may implement or execute various example logical blocks, modules, and circuits described with reference to content disclosed in this application. Alternatively, the processor may be a combination of processors implementing a computing function, for example, a combination of one or more microprocessors, or a combination of the DSP and a microprocessor.

Method or algorithm steps described with reference to the content disclosed in this application may be implemented by hardware, or may be implemented by a processor by executing a software instruction. The software instruction may include a corresponding software module. The software module may be stored in a RAM memory, a flash memory, a ROM memory, an EPROM memory, an EEPROM memory, a register, a hard disk, a removable hard disk, a CD-ROM, or a storage medium of any other form known in the art. For example, a storage medium is coupled to a processor, so that the processor can read information from the storage medium or write information into the storage medium. Certainly, the storage medium may be a component of the processor. The processor and the storage medium may be located in the ASIC. In addition, the ASIC may be located in a data receiving device and/or a data sending device. Certainly, the processor and the storage medium may exist as discrete components in a data receiving device and/or a data sending device.

A person skilled in the art should be aware that, in the foregoing one or more examples, functions described in this application may be implemented by hardware, software, firmware, or any combination thereof. When implemented by software, the foregoing functions may be stored in a computer-readable medium or transmitted as one or more instructions or as code in the computer-readable medium. The computer-readable medium includes a computer storage medium and a communications medium, where the communications medium includes any medium that enables a computer program to be transmitted from one place to another place. The storage medium may be any available medium accessible to a general-purpose or dedicated computer.

In the foregoing specific implementations, the objectives, technical solutions, and beneficial effects of this application are further described in detail. It should be understood that the foregoing descriptions are merely specific implementations of this application, but are not intended to limit the protection scope of this application. All modifications, equivalent replacements, improvements, or the like made based on the technical solutions of this application shall fall within the protection scope of this application.

What is claimed is:

1. A method of data processing, comprising:
   modulating, by a data sending device, a to-be-transmitted bit sequence to obtain a first symbol sequence, wherein the first symbol sequence comprises M complex-valued symbols, and M is an integer greater than or equal to 1;
   splitting, by the data sending device, a real part and an imaginary part of each complex-valued symbol in the first symbol sequence into two symbols to obtain a second symbol sequence, wherein the second symbol sequence comprises 2M symbols;
   performing, by the data sending device, phase rotation on the symbols in the second symbol sequence to obtain a third symbol sequence;
   generating, by the data sending device, at least one single carrier frequency division multiple access (SC-FDMA) symbol corresponding to the to-be-transmitted bit sequence by using the third symbol sequence; and
   transmitting, by the data sending device, the at least one SC-FDMA symbol,
   wherein the generating at least one SC-FDMA symbol by using the third symbol sequence comprises:
      performing discrete Fourier transform (DFT) of 2M points on the third symbol sequence to obtain a fourth symbol sequence; and
      generating the at least one SC-FDMA symbol by using the fourth symbol sequence, and
   and the generating the at least one SC-FDMA symbol by using the fourth symbol sequence comprises:
      multiplying the fourth symbol sequence by a window function to obtain a fifth symbol sequence that comprises Q symbols, wherein Q is an integer greater than or equal to 1, and $2M \geq Q > M$; and
      performing inverse fast Fourier transformation (IFFT) on the fifth symbol sequence to generate the at least one SC-FDMA symbol, and
   the performing phase rotation on the symbols in the second symbol sequence comprises: multiplying each symbol in the second symbol sequence by a phase rotation factor $e^{j\varphi_k}$, wherein j is an imaginary unit, e is a base of a natural logarithm, and $\varphi_k$ is a phase of the phase rotation factor and satisfies the following formula:

$$\varphi_k = \begin{cases} \frac{k\pi}{2}\left(1 - \frac{1}{M}\right) + n_k\pi & \text{when } Q \text{ is an even number} \\ \frac{k\pi}{2} + n_k\pi & \text{when } Q \text{ is an odd number} \end{cases}$$

wherein
k=0, 1, 2, . . . , 2M−1, and $n_k$ is any integer.

2. The method according to claim 1, wherein the generating the at least one SC-FDMA symbol by using the fourth symbol sequence comprises:
   cyclically extending the fourth symbol sequence to obtain a fifth symbol sequence that comprises Q symbols, wherein Q is an integer greater than or equal to 2, and $Q \geq 2M$;
   multiplying the fifth symbol sequence by a window function to obtain a sixth symbol sequence that comprises Q symbols; and
   performing inverse fast Fourier transformation (IFFT) on the sixth symbol sequence to generate the at least one SC-FDMA symbol.

3. The method according to claim 1, wherein the modulating, by a data sending device, a to-be-transmitted bit sequence comprises: modulating a to-be-transmitted bit by using at least one of π/4 rotation binary phase shift keying (BPSK), quadrature phase shift keying (QPSK), or quadrature amplitude modulation (QAM) modulation schemes.

4. The method according to claim 1, wherein the modulating, by a data sending device, a to-be-transmitted bit sequence comprises:
   modulating a to-be-transmitted bit by using π/4 rotation binary phase shift keying (BPSK), wherein the π/4 rotation BPSK modulation scheme is a modulation scheme in which +π/4 rotation or −π/4 rotation is performed on a BPSK modulation constellation diagram; and
   modulating the to-be-transmitted bit sequence within different time units by using the at least one SC-FDMA symbol as a time unit and by alternately using the modulation scheme of +π/4 rotation on the BPSK modulation constellation diagram and the modulation scheme of −π/4 rotation on the BPSK modulation constellation diagram, wherein a same rotation manner is used for to-be-transmitted bits within a same time unit.

5. The method according to claim 1, wherein for the splitting a real part and an imaginary part of each complex-valued symbol in the first symbol sequence into two symbols to obtain a second symbol sequence, the first symbol sequence is denoted as d, and d satisfies the following formula:

$$d=[d_0, d_1, \ldots, d_{m-1}]; \text{ and}$$

the second symbol sequence is denoted as $d_{offset}$, and $d_{offset}$ satisfies the following formula:

$d_{offset}$=[Re{$d_0$}, Im{$d_0$}, Re{$d_1$}, Im{$d_1$} Re{$d_{M-1}$}, Im{$d_{M-1}$}], wherein Re{ } indicates an operation of obtaining a real part and Im{ } indicates an operation of obtaining an imaginary part.

6. The method according to claim 1, wherein the data sending device is user equipment, and the data sending device receives at least one of information about M, information about Q, or information about a ratio relationship between M and Q.

7. A data sending device, comprising:
a processor, configured, comprising:
modulate a to-be-transmitted bit sequence to obtain a first symbol sequence, wherein the first symbol sequence comprises M complex-valued symbols, and M is an integer greater than or equal to 1;
split a real part and an imaginary part of each complex-valued symbol in the first symbol sequence into two symbols to obtain a second symbol sequence, wherein the second symbol sequence comprises 2M symbols;
perform phase rotation on the symbols in the second symbol sequence to obtain a third symbol sequence; and
generate at least one single carrier frequency division multiple access (SC-FDMA) symbol corresponding to the to-be-transmitted bit sequence by using the third symbol sequence; and
a transmitter, configured to transmit the at least one SC-FDMA symbol,
wherein for the generating at least one SC-FDMA symbol by using the third symbol sequence, the processor is configured to:
perform discrete Fourier transform (DFT) of 2M points on the third symbol sequence to obtain a fourth symbol sequence; and
generate the at least one SC-FDMA symbol by using the fourth symbol sequence, and
the generating the at least one SC-FDMA symbol by using the fourth symbol sequence, the processor is configured to:
multiply the fourth symbol sequence by a window function to obtain a fifth symbol sequence that comprises Q symbols, wherein Q is an integer greater than or equal to 1, and 2M≥Q≥M; and
perform inverse fast Fourier transformation (IFFT) on the fifth symbol sequence to generate the at least one SC-FDMA symbol,
wherein for the performing phase rotation on the symbols in the second symbol sequence, the processor is configured to: multiply each symbol in the second symbol sequence by a phase rotation factor $e^{j\varphi_k}$, wherein j is an imaginary unit, e is a base of a natural logarithm, and $\varphi_k$ is a phase of the phase rotation factor and satisfies the following formula:

$$\varphi_k = \begin{cases} \frac{k\pi}{2}\left(1-\frac{1}{M}\right) + n_k\pi & \text{when } Q \text{ is an even number} \\ \frac{k\pi}{2} + n_k\pi & \text{when } Q \text{ is an odd number} \end{cases}$$

wherein
k=0, 1, 2, . . . , 2M−1, and $n_k$ is any integer.

8. The data sending device according to claim 7, wherein for the generating the at least one SC-FDMA symbol by using the fourth symbol sequence, the processor is configured to: cyclically extend the fourth symbol sequence to obtain a fifth symbol sequence that comprises Q symbols, wherein Q is an integer greater than or equal to 2, and Q 2M;
multiply the fifth symbol sequence by a window function to obtain a sixth symbol sequence that comprises Q symbols; and
perform inverse fast Fourier transformation (IFFT) on the sixth symbol sequence to generate the at least one SC-FDMA symbol.

9. The data sending device according to claim 7, wherein for the modulating a to-be-transmitted bit sequence, the processor is configured to: modulate a to-be-transmitted bit by using at least one of π/4 rotation binary phase shift keying (BPSK), quadrature phase shift keying (QPSK), or quadrature amplitude modulation (QAM) modulation schemes.

10. The data sending device according to claim 7, wherein for the modulating a to-be-transmitted bit sequence, the processor is configured to:
modulate a to-be-transmitted bit by using π/4 rotation binary phase shift keying (BPSK), wherein the π/4 rotation BPSK modulation scheme is a modulation scheme in which +π/4 rotation or −π/4 rotation is performed on a BPSK modulation constellation diagram; and
modulate the to-be-transmitted bit sequence within different time units by using the at least one SC-FDMA symbol as a time unit and by alternately using the modulation scheme of +π/4 rotation on the BPSK modulation constellation diagram and the modulation scheme of −π/4 rotation on the BPSK modulation constellation diagram, wherein a same rotation manner is used for to-be-transmitted bits within a same time unit.

11. The data sending device according to claim 7, wherein for the splitting a real part and an imaginary part of each complex-valued symbol in the first symbol sequence into two symbols to obtain a second symbol sequence, the first symbol sequence is denoted as d, and d satisfies the following formula:

$d=[d_0, d_1, \ldots, d_{m-1}]$; and the second symbol sequence is denoted as $d_{offset}$, and $d_{offset}$ satisfies the following formula:

$d_{offset}$=[Re{$d_0$}, Im{$d_0$}, Re{$d_1$}, Im{$d_1$} Re{$d_{M-1}$}, Im{$d_{M-1}$}], wherein Re{ } indicates an operation of obtaining a real part and Im{ } indicates an operation of obtaining an imaginary part.

12. The data sending device according to claim 7, wherein the data sending device is user equipment, and the data sending device further comprises a receiver, configured to receive at least one of information about M, information about Q, or information about a ratio relationship between M and Q.

* * * * *

UNITED STATES PATENT AND TRADEMARK OFFICE
CERTIFICATE OF CORRECTION

PATENT NO. : 11,245,562 B2
APPLICATION NO. : 16/368618
DATED : February 8, 2022
INVENTOR(S) : Zeng et al.

It is certified that error appears in the above-identified patent and that said Letters Patent is hereby corrected as shown below:

On the Title Page

Applicant (71): "HUAWEI TECHNOLOGIES CO., LTD., Guangdong (CN)" should read
-- HUAWEI TECHNOLOGIES CO., LTD., Shenzhen (CN) --.

Signed and Sealed this
Twenty-fourth Day of May, 2022

Katherine Kelly Vidal
*Director of the United States Patent and Trademark Office*